United States Patent
Lee et al.

(10) Patent No.: US 7,948,596 B2
(45) Date of Patent: *May 24, 2011

(54) MULTI-DOMAIN VERTICAL ALIGNMENT LIQUID CRYSTAL DISPLAY

(75) Inventors: Seok-Lyul Lee, Hsinchu (TW); Tun-Chun Yang, Hsinchu (TW); Chih-Ming Chang, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 724 days.

This patent is subject to a terminal disclaimer.

(21) Appl. No.: 11/931,254

(22) Filed: Oct. 31, 2007

(65) Prior Publication Data

US 2008/0266504 A1    Oct. 30, 2008

Related U.S. Application Data

(63) Continuation-in-part of application No. 11/739,901, filed on Apr. 25, 2007.

(51) Int. Cl.
*G02F 1/1343* (2006.01)
*G02F 1/1337* (2006.01)
*G02F 1/1333* (2006.01)

(52) U.S. Cl. ........ 349/141; 349/129; 349/143; 349/139; 349/138

(58) Field of Classification Search .............. 349/129, 349/144, 114, 141
See application file for complete search history.

(56) References Cited

U.S. PATENT DOCUMENTS

| | | | |
|---|---|---|---|
| 5,608,556 A * | 3/1997 | Koma | 349/143 |
| 6,853,427 B2 | 2/2005 | Park et al. | |
| 6,900,869 B1 | 5/2005 | Lee et al. | |
| 6,954,248 B2 | 10/2005 | Song et al. | |
| 7,016,001 B2 | 3/2006 | Tanaka et al. | |
| 2007/0247574 A1* | 10/2007 | Kudo | 349/114 |
| 2008/0266480 A1 | 10/2008 | Lee | |

FOREIGN PATENT DOCUMENTS

| CN | 1711495 A | 12/2005 |
|---|---|---|
| CN | 1881049 A | 12/2006 |
| CN | 101144952 | 3/2008 |

* cited by examiner

*Primary Examiner* — Wen-Ying P Chen
(74) *Attorney, Agent, or Firm* — Tim Tingkang Xia; Morris, Manning & Martin, LLP

(57) ABSTRACT

A liquid crystal display device comprising: (i) a first substrate and a second substrate positioned apart to define a cell gap, (ii) a liquid crystal layer positioned in the cell gap, and (iii) a plurality of gate lines arranged in a first direction and a plurality of data lines arranged in a second direction substantially perpendicular to the first direction to define a plurality of pixels, each pixel having a first portion and a second portion, and comprising: (a) a first dielectric layer formed on the first substrate, (b) a first pixel electrode formed on the first dielectric layer, (c) a second dielectric layer formed to at least partially cover the first pixel electrode, (d) a second pixel electrode formed on the second dielectric layer such that the second pixel electrode is connectable to the first pixel electrode, and (e) a common electrode formed on the second dielectric layer.

15 Claims, 20 Drawing Sheets

MULTI-DOMAIN VERTICAL ALIGNMENT LIQUID CRYSTAL DISPLAY

CROSS-REFERENCE TO RELATED PATENT APPLICATION

This application is a continuation-in-part of U.S. patent application Ser. No. 11/739,901, entitled "Multi-Domain Vertical Alignment Liquid Crystal Display" by Seok-Lyul LEE, which was filed on Apr. 25, 2007, and with the same assignee as that of this application. The disclosure of the above identified co-pending application is incorporated herein by reference in its entirety.

Some references, if any, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to a liquid crystal display (LCD), and more particularly to an LCD device that utilizes a patterned structure to improve the viewing angle, light transmittance, contrast ratio and response time of display and a method of manufacturing same.

BACKGROUND OF THE INVENTION

Liquid crystal display (LCD) is commonly used as a display device because of its capability of displaying images with good quality while using little power. An LCD apparatus includes an LCD panel formed with liquid crystal cells and pixel elements with each associating with a corresponding liquid crystal cell and having a liquid crystal capacitor and a storage capacitor, a thin film transistor (TFT) electrically coupled with the liquid crystal capacitor and the storage capacitor. These pixel elements are substantially arranged in the form of a matrix having a number of pixel rows and a number of pixel columns. Typically, scanning signals are sequentially applied to the number of pixel rows for sequentially turning on the pixel elements row-by-row. When a scanning signal is applied to a pixel row to turn on corresponding TFTs of the pixel elements of a pixel row, source signals (image signals) for the pixel row are simultaneously applied to the number of pixel columns so as to charge the corresponding liquid crystal capacitor and storage capacitor of the pixel row for aligning orientations of the corresponding liquid crystal cells associated with the pixel row to control light transmittance therethrough. By repeating the procedure for all pixel rows, all pixel elements are supplied with corresponding source signals of the image signal, thereby displaying the image signal thereon.

Liquid crystal molecules have a definite orientational alignment as a result of their long, thin shapes. The orientations of liquid crystal molecules in liquid crystal cells of an LCD panel play a crucial role in the transmittance of light therethrough. For example, in a twist nematic (TN) LCD, when the liquid crystal molecules are in its tilted orientation, light from the direction of incidence is subject to various different indexes of reflection. Since the functionality of LCDs is based on the birefringence effect, the transmittance of light will vary with different viewing angles. Due to such differences in light transmission, optimum viewing of an LCD is limited within a narrow viewing angle. The limited viewing angle of LCDs is one of the major disadvantages associated with the LCDs and is a major factor in restricting applications of the LCDs.

Several approaches exist for increasing the viewing angles of LCDs, such as in-plane switching (IPS), and multi-domain vertical alignments. The IPS mode uses comb-like inter-digitized electrodes to apply electrical fields in the plane of the substrates, thereby aligning the liquid crystal molecules along the substrates and providing wide viewing angles for use in wide viewing angle monitors or other applications. However, although IPS provides wide viewing angles, it requires high voltages and has low aperture ratios. In addition, due to the planar electric field structure, IPS mode inherently suffers from severe image sticking.

The vertical alignment mode uses a liquid crystal material with the negative dielectric anisotropy and vertical alignment films. When no voltage is applied to the mode, liquid crystal molecules are aligned in a vertical direction and no light passes through the liquid crystal molecules and therefore a black display appears. When a predetermined voltage is applied, the liquid crystal molecules are aligned in a horizontal direction and light passes through the liquid crystal molecules and a white display appears. The vertical alignment mode provides a high contrast ratio of display and a fast response speed. Furthermore, a multi-domain arrangement is achieved by introducing a protruding structure that forces the liquid crystal molecules to tilt in different directions, thereby providing an excellent viewing angle characteristic for white display and black display. As shown in FIG. 6, a conventionally vertical alignment mode 600 utilizes a layer 610 with a protrusion structure 612 formed on a color filter substrate 620 to divide liquid crystal domains. As a result, it requires an extra photolithography step during fabrication, and thus increases production cost. Additionally, the protruding structure 612 may make the contrast ratio of display lower due to the light leakage in the black display.

Therefore, a heretofore unaddressed need exists in the art to address the aforementioned deficiencies and inadequacies.

SUMMARY OF THE INVENTION

The present invention, in one aspect, relates to a liquid crystal display (LCD) device. In one embodiment, the LCD device has: (i) a first substrate and a second substrate positioned apart to define a cell gap, (ii) a liquid crystal layer positioned in the cell gap between the first substrate and the second substrate, and (iii) a plurality of gate lines arranged in a first direction on the first substrate and a plurality of data lines arranged crossing the plurality of gate lines in a second direction that is perpendicular to the first direction on the first substrate to define a plurality of pixels. In one embodiment, each pixel has a first portion and a second portion, and each pixel has: (a) a first dielectric layer formed on the first substrate, (b) a first pixel electrode formed on the first dielectric layer, (c) a second dielectric layer formed to at least partially cover the first pixel electrode, where the second dielectric layer is formed with at least one opening in at least one of the first portion and the second portion of the pixel to expose at least one portion of the first pixel electrode, (d) a second pixel electrode formed on the second dielectric layer and proximate to where the at least one opening is formed such that the second pixel electrode is connectable to the first pixel electrode through the at least one opening, and (e) a common electrode formed on the second dielectric layer.

In one embodiment, the first pixel electrode is formed of indium zinc oxide (IZO), amorphous indium tin oxide (ITO), poly ITO, or a combination of these materials. The first pixel electrode has a thickness in the range of about 0.01-3.00 μm and a geometric shape of a circle, oval, rectangle, polygon, or a combination of these shapes.

In one embodiment, the second dielectric layer in each pixel has a patterned structure. The patterned structure includes a geometric shape of a circle, oval, rectangle, polygon, star, cross, or a combination of these shapes. In one embodiment, the second dielectric layer has a thickness in the range of about 0.01-100.00 μm. The second dielectric layer is formed of SiNx, SiOx, SiON or insulating organic material.

In one embodiment, the second pixel electrode and the common electrode are formed of transparent or opaque conductive material. The second pixel electrode has a thickness in the range of about 0.01-6.00 μm, and a geometric shape of a circle, oval, rectangle, polygon, or a combination of these shapes. The size of the second pixel electrode is smaller than the size of the second dielectric layer.

In one embodiment, the liquid crystal layer incorporates liquid crystals. These liquid crystals have a negative dielectric anisotropy. The liquid crystals are selected such that a product of the refractive index $\delta_n$ of the liquid crystals and the cell gap is in a range of about 0.01-1.00 μm.

In one embodiment, the common electrode is on the same plane as the second pixel electrode and surrounding the second pixel electrode. The distance is defined between the second pixel electrode and common electrode. This distance is greater than the cell gap. The common electrode has a first electric potential, and the first pixel electrode and the second pixel electrode have an identical, second electric potential that is substantially different from the first electric potential. When a voltage is applied to one of the first pixel electrode and the second pixel electrode, and the common electrode, a corresponding voltage difference is established, and an oblique electric field is generated in the liquid crystal layer. This generated oblique electric field drives the liquid crystals of the liquid crystal layer in desired directions.

In one embodiment, the LCD device includes a plurality of slits formed in the first pixel electrode. The plurality of slits is formed within the first pixel electrode or along an edge of the first pixel electrode. The plurality of slits is formed to have a pattern of a cross, a double cross, a diagonal cross, a double diagonal cross, or a combination of these shapes. The slits are symmetrically formed around the second pixel electrode located at a center of the first portion and the second portion of the pixel.

In another aspect, the present invention relates to an LCD device. In one embodiment, the LCD device has: (i) a first substrate and a second substrate positioned apart to define a cell gap, (ii) a liquid crystal layer positioned in the cell gap between the first substrate and the second substrate, and (iii) a plurality of gate lines arranged in a first direction on the first substrate and a plurality of data lines arranged crossing the plurality of gate lines in a second direction that is perpendicular to the first direction on the first substrate to define a plurality of pixels. Each pixel has a first portion and a second portion. The pixel has: (a) a first dielectric layer formed on the first substrate, (b) a first pixel electrode formed on the first dielectric layer, (c) a second dielectric layer formed to at least partially cover the first pixel electrode, where the second dielectric layer is formed with an inner portion, an outer portion and at least one opening in at least one of the first portion and the second portion of the pixel to expose at least one portion of the first pixel electrode, where each of the first portion and the second portion of the pixel has an inner portion and an outer portion, (d) a second pixel electrode formed at a center of an inner portion of the second dielectric layer and proximate to the at least one opening in at least one of the first portion and the second portion of the pixel such that the second pixel electrode is connectable to the first pixel electrode through the at least one opening, and (e) a common electrode formed on the second dielectric layer.

In one embodiment, the inner portion of the second dielectric layer has a geometric shape of a square, circle, oval, rectangle, polygon, cross, diagonal cross, or a combination of these shapes.

In another aspect, the present invention relates to a liquid crystal display (LCD) device. In one embodiment, the LCD device has: (i) a first substrate and a second substrate positioned apart to define a cell gap, (ii) a liquid crystal layer positioned in the cell gap between the first substrate and the second substrate, and (iii) a plurality of gate lines arranged in a first direction on the first substrate and a plurality of data lines arranged crossing the plurality of gate lines in a second direction that is perpendicular to the first direction on the first substrate to define a plurality of pixels. Each pixel has a first portion and a second portion. Each pixel has: (a) a first dielectric layer formed on the first substrate, (b) a first pixel electrode formed on the first dielectric layer, (c) a second dielectric layer formed to at least partially cover the first pixel electrode, where the second dielectric layer is formed with at least one opening in at least one of the first portion and the second portion of the pixel to expose at least one portion of the first pixel electrode, (d) a second pixel electrode formed at a center of the second dielectric layer and proximate to the at least one opening in at least one of the first portion and the second portion of the pixel such that the second pixel electrode is connectable to the first pixel electrode through the at least one opening, (e) a plurality of slits symmetrically formed around the second pixel electrode, and (f) a common electrode formed on the second dielectric layer.

In one embodiment, the plurality of slits on the LCD device has a geometric shape of a circle, oval, rectangle, polygon, cross, diagonal cross, or a combination of these shapes.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
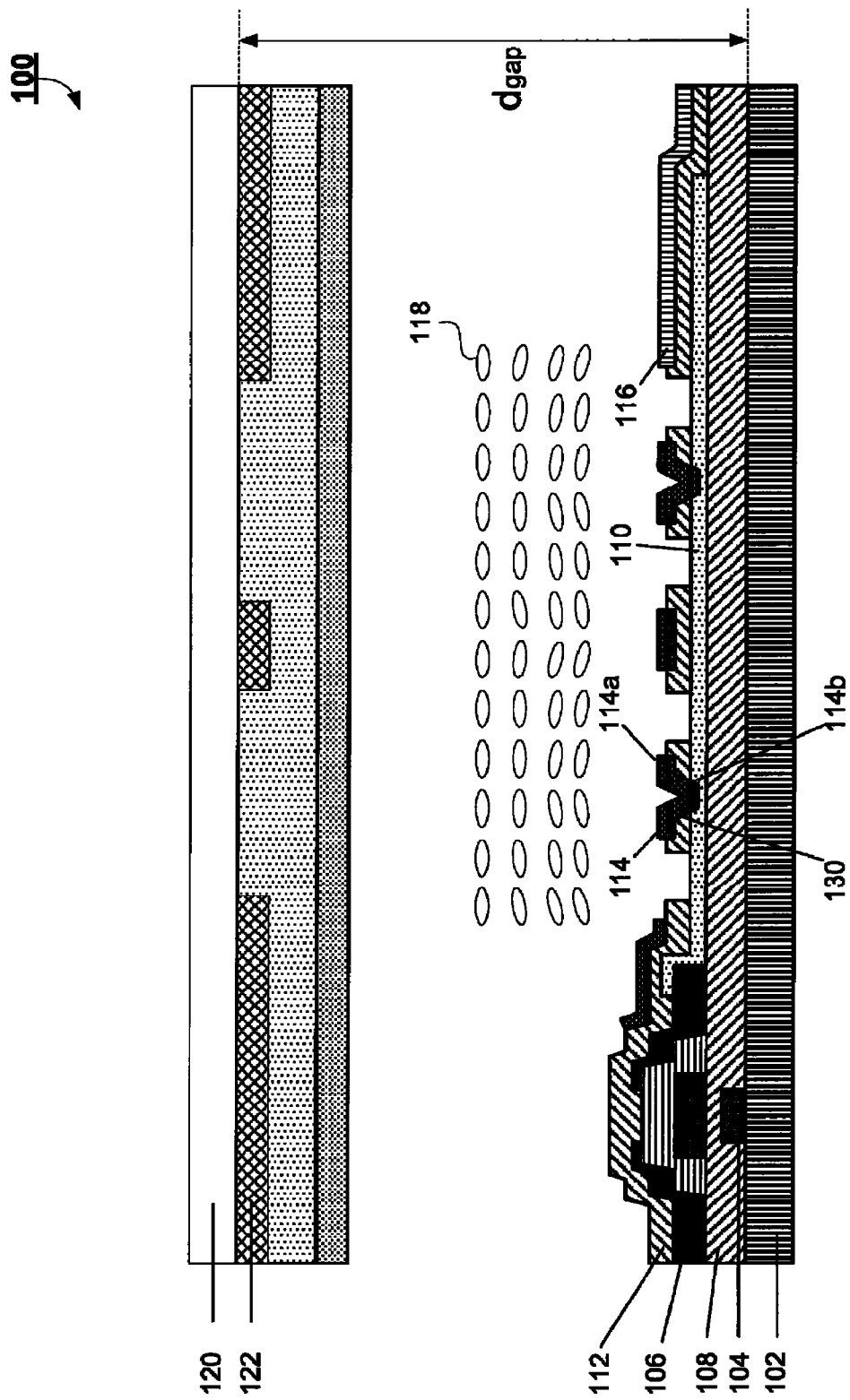
FIG. 1 illustrates a cross-sectional view of a display pixel of an LCD device according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-5. In accordance with the purposes of this invention, as embodied and broadly described herein, this invention, in one aspect, relates to an LCD device that utilizes a passivation patterned structure to improve the viewing angle, light transmittance, contrast ratio and response time of display.

LCD Device with Slits on the First Pixel Electrode

Referring to FIG. 1, an LCD device 100 is illustrated according to one embodiment of the present invention. In this exemplary embodiment, the LCD device 100 includes a first substrate 102, a first dielectric layer (a gate insulating film) 108, a second dielectric layer (a passivation layer) 112, a first pixel electrode 110, a plurality of second pixel electrodes 114, a common electrode 116, at least one gate line 104, at least one data line 106, a plurality of liquid crystals 118, and a second substrate 120.

The first dielectric layer 108 is formed of a dielectric material on the first substrate 102. A plurality of gate lines 104 (FIG. 2A) and a plurality of data lines 106 are formed on the first dielectric layer 108. The plurality of gate lines 104 is arranged in a first direction and the plurality of data lines 106 is arranged crossing the plurality of gate lines 104 in a second direction on the first substrate 102 to define a plurality of pixels. In one embodiment, the plurality of pixels is arranged in a matrix. The first direction corresponds to the row direction of the pixel matrix, and the second direction corresponds to the column direction of the pixel matrix, as shown in FIG. 2A.

Figure 2A:
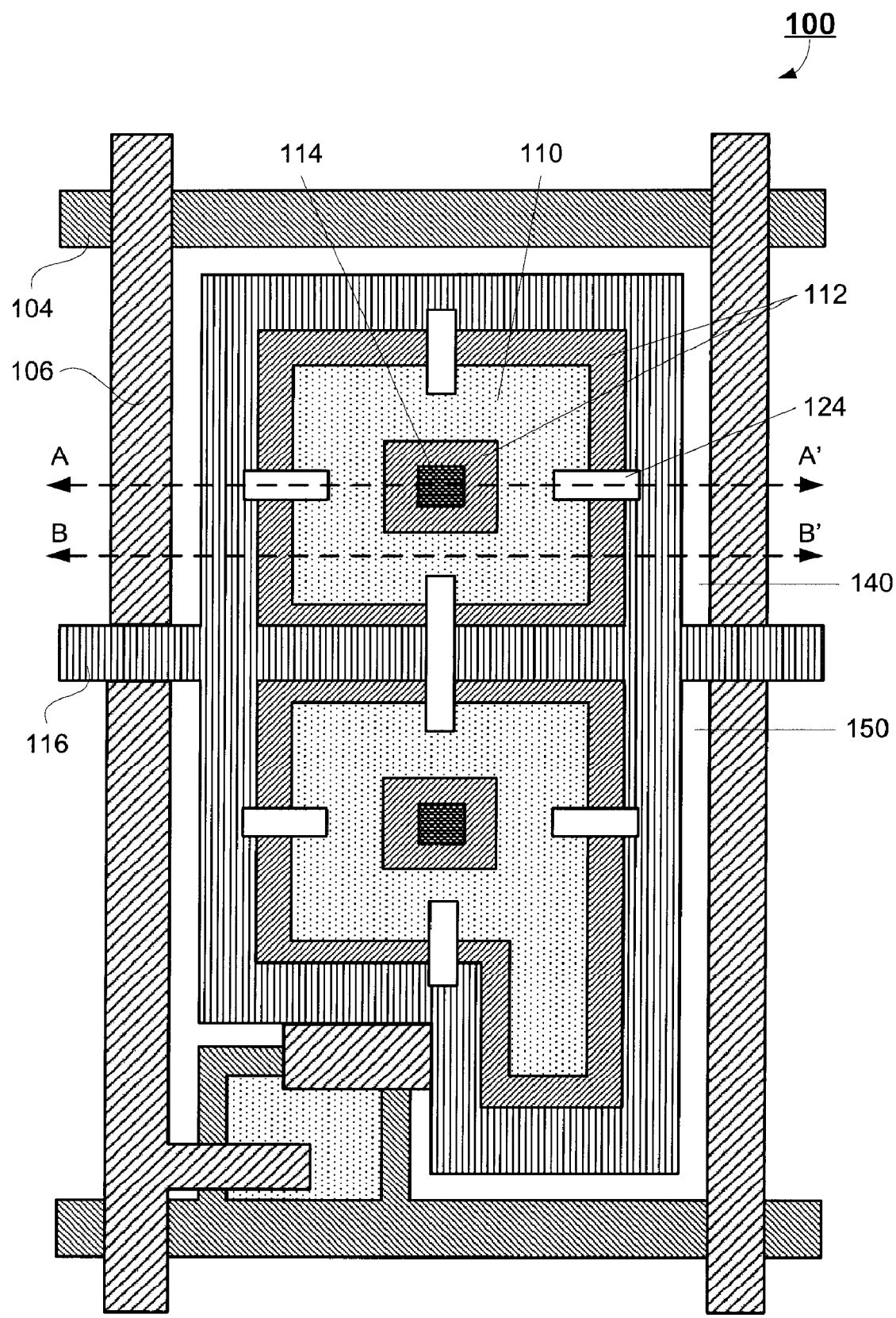
FIG. 2 shows schematically (a) a plane view of a display pixel of an LCD device and (b) a cross-sectional view of the display pixel of the LCD device along lines A-A', and B-B' according to one embodiment of the present invention.
Figure 2B:
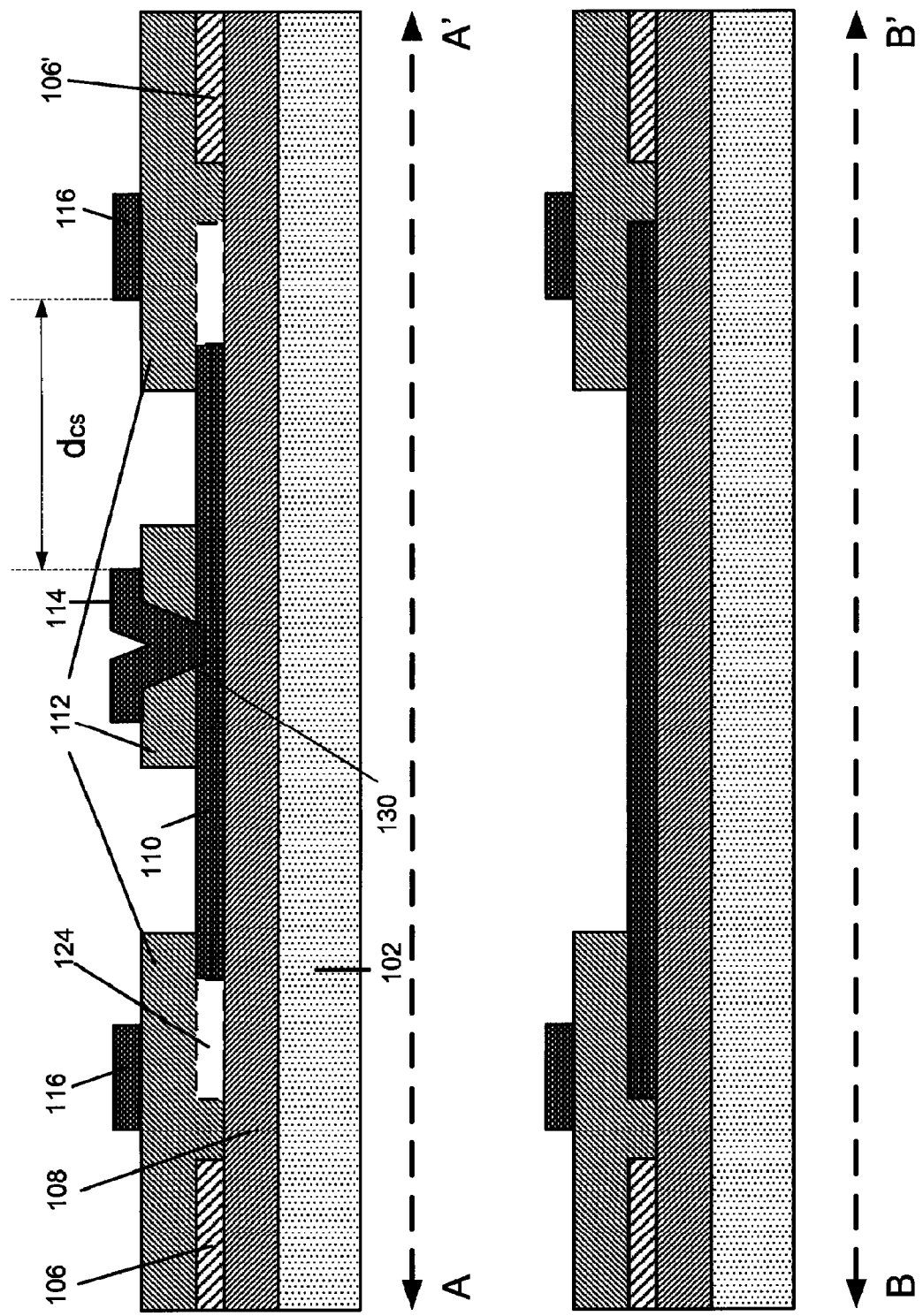

Still referring to FIGS. 1, 2A and 2B, each pixel includes a first pixel electrode 110, a second pixel electrode 114 and a common electrode 1 16. The first pixel electrode 110 is formed on the first dielectric layer 108 and spatially separated from its neighboring data lines 106 and gate lines 104. The second dielectric layer 112 is formed to partially cover a plurality of first pixel electrodes 110, a plurality of gate lines 104, a plurality of data lines 106 and the remaining portion of the first dielectric layer 108. The second dielectric layer 112 has a patterned structure defining an opening 130 in each pixel area. The opening 130 is formed to expose a central portion of the first pixel electrode 110. The patterned structure can be a geometric shape of a square, circle, rectangle, polygon, star, cross, or a combination of these shapes. In each pixel, the second pixel electrode 114 is formed on the second dielectric layer 112 proximate to and around where the opening 130 is located. As shown in FIG. 1, the second pixel electrode 114 has a flange portion 114a formed on the second dielectric layer 112 and a connection portion 114b extending from the flange portion 114a to reach the first pixel electrode 110 through the opening 130. The flange portion 114a of the second pixel electrode 114 may have a geometric shape of a circle, oval, rectangle, or polygon. Additionally, a common electrode 116 is formed on the second dielectric layer 112 and distantly partially surrounds the second pixel electrode 114 in each pixel area.

In one embodiment, the first pixel electrode 110 is formed of indium zinc oxide (IZO), amorphous indium tin oxide (ITO), poly indium tin oxide (ITO), or any combination of these materials, and has a thickness in the range of about 0.01-3.00 μm. The first pixel electrode 110 has a shape of a rectangle and also can have a geometric shape of a circle, oval, square, polygon, or a combination of these shapes.

In one embodiment, the second pixel electrode 114 and the common electrode 116 are formed of transparent or opaque conductivity material. The first dielectric layer 108 is formed of a insulating material such as silicon nitride (SiNx), silicon oxide (SiOx) or silicon oxynitride (SiON), or the like. The second dielectric layer 112 is formed of SiNx, SiOx, SiON or organic insulating material such as polyimide, and has a thickness in the range of about 0.01-100.00 μm. The second dielectric layer 112 in each pixel has a patterned structure. The patterned structure includes a geometric shape of a circle, oval, rectangle, polygon, star, cross, or a combination of these shapes, or a geometric shape that is not of any of the aforementioned shapes.

The second pixel electrode 114 has a geometric shape of a circle, oval, rectangle, polygon, or a combination of these shapes, and a thickness in the range of about 0.01-6.00 μm. The size of the second pixel electrode 114 is smaller than the size of the second dielectric layer 112.

A liquid crystal layer is positioned between the first substrate 102 and the second substrate 120, and is filled with liquid crystal molecules 118. In one embodiment, the liquid crystals include a liquid crystal material having a negative dielectric anisotropy, such as twisted nematic (TN) liquid crystals, for example. The liquid crystals are selected such that a product of the refractive index $\delta_n$ of the liquid crystals and the cell gap is in a range of about 0.01-1.00 μm. The liquid crystals 118 in the liquid crystal layer are aligned homeotropically to the first substrate 102 and the second substrate 120 in the absence of an electric field, which is corresponding to a black display in the LCD device 100.

Additionally, the second substrate 120 may, for example, include a black matrix layer 122 for preventing light leakage in regions outside the pixel regions of the first substrate 102. A polarizer (not shown) and an analyzer (not shown) may also be arranged on the outer surfaces of the first substrate 102 and second substrate 120, respectively. A polarizing axis of the polarizer and an absorbing axis of the analyzer are preferably orthogonal to each other.

In one embodiment, the common electrode 116 has a first electric potential, and the first pixel electrode 110 and the second pixel electrode 114 have an identical, second electric potential that is substantially different from the first electric potential. When a voltage is applied to one of the first pixel electrode 110 and the second pixel electrode 114, and the common electrode 116, a corresponding voltage difference is established between at least one of the first pixel electrode 110 and the second pixel electrode 114 and the common electrode 116, and an convex oblique electric field near the second pixel electrode 114 is generated in the liquid crystal layer. The generated oblique electric field drives the liquid crystals of the liquid crystal layer in desired directions.

Referring now to FIG. 2A, a plane view of a unit pixel of the LCD device 100 is schematically shown according to one embodiment of the present invention. In one embodiment, each pixel includes (i) a first portion 140, (ii) a second portion 150, both portions having similar structure, (iii) a gate line 104, (iv) a data line 106, and (v) a common electrode 116. In FIG. 2A, the lower left corner of the drawing shows the structure of a TFT as a switching element, which is formed on the crossing point of the gate line 104 and the data line 106. This TFT is well known to those skilled in the art, and will not be described here. Each of the first portion 140 and the second portion 150 of the LCD device 100 has: (i) a first pixel electrode 110, (ii) a second dielectric layer 112, (iii) a second pixel electrode 114, and (iv) a plurality of slits 124 formed in the first pixel electrode 110. The generated concave oblique electric field near the plurality of slits 124 drives the liquid crystals of the liquid crystal layer in desired directions and enhances the display viewing angles.

Referring now to FIG. 2B, cross-sectional views of the LCD device 100 along lines A-A', and B-B' of the FIG. 2A are shown according to one embodiment of the present invention. A first dielectric layer 108 is formed on the first substrate 102. A data line 106 for this pixel, a data line 106' for a neighboring pixel, a first pixel electrode 110 and a plurality of slits 124 on the first pixel electrode are formed on the first dielectric layer 108. On top of these layers, a second dielectric layer 112 is formed. Then, a common electrode 116 and a second pixel electrode 114 are formed on the second dielectric layer 112. The second pixel electrode 114 and the first pixel electrode 110 are connected through a contact through hole or opening 130. The common electrode 116 is on the same plane as the second pixel electrode 114 and at least partially surrounding the second pixel electrode 114, where a distance $d_{cs}$ is defined between the common electrode 116 and the second pixel electrode 114. This distance is greater than the cell gap $d_{gap}$ as shown in FIG. 1.

Referring now to both FIGS. 2A and 2B, in one embodiment, the first pixel electrode 110 has a thickness in the range of about 0.01-3.00 μm. The second dielectric layer 112 in each pixel has a patterned structure. The patterned structure can be a geometric shape of a square, circle, oval, rectangle, polygon, star, cross, a combination of these shapes, or a structure that is not one of the aforementioned structures. It has a thickness in the range of about 0.01-100.00 μm, and is formed of SiNx, SiOx, SiON or insulating organic material.

In one embodiment, the second dielectric layer 112 has an opening 130 near a center of each of the first portion 140 and the second portion 150, respectively. Since the second pixel electrode 114 is formed on the second dielectric layer 112, and the second pixel electrode 114 reaches to the first pixel electrode 110, thus both of the first pixel electrode 110 and the second pixel electrode 114 have the same electric potential. Therefore the second pixel electrode 114 is positioned near the center of each of the first portion 140 or the second portion 150 of the pixel, and has a geometric shape of a square, circle, oval, rectangle, polygon, or a combination of these shapes. The size of the second pixel electrode 114 is smaller than the size of the second dielectric layer 112.

The cross-sectional view of the LCD device 100 along line B-B' of the FIG. 2A is similar to that of line A-A' of the FIG. 2A, except the view along line B-B' does not include (i) the island-shaped second dielectric layer 112, (ii) the second pixel electrode 114, and (iii) the plurality of the first pixel electrode slits 124.

FIGS. 3A-3J show schematically plane views of various embodiments of LCD device with a plurality of slits 124 on the first pixel electrode according to various embodiments of the present invention.

Figure 3A:
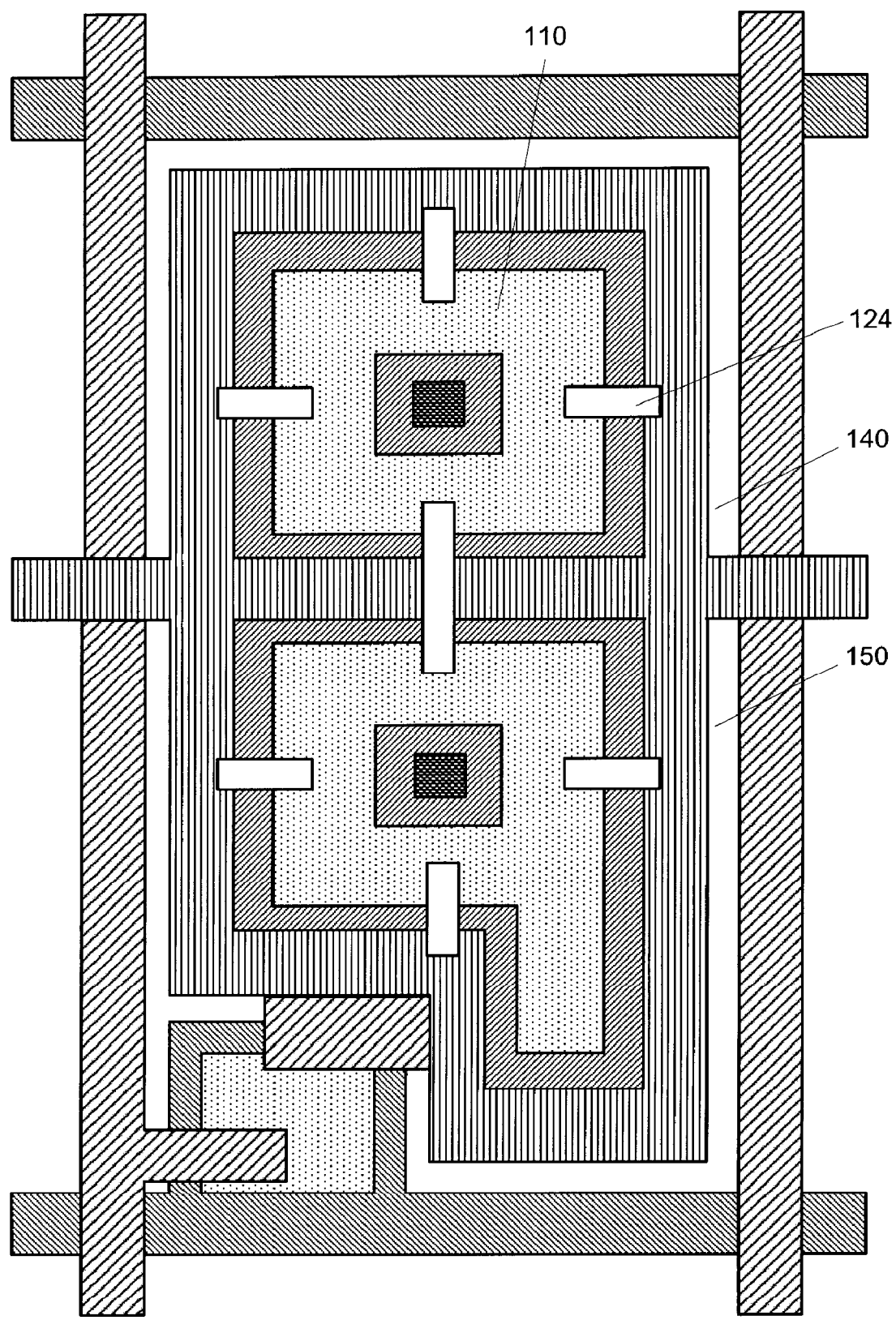
FIGS. 3A-3J show schematically plane views of various embodiments of display pixels of LCD devices with a plurality of slits on the first pixel electrode according to embodiments of the present invention.

FIG. 3A shows a schematically plane view of one embodiment of a display pixel of an LCD device with a plurality of slits 124 arranged in a cross shape on the edge of the first pixel electrode 110 for each of the first portion 140 and the second portion 150 of the display pixel.

Figure 3B:
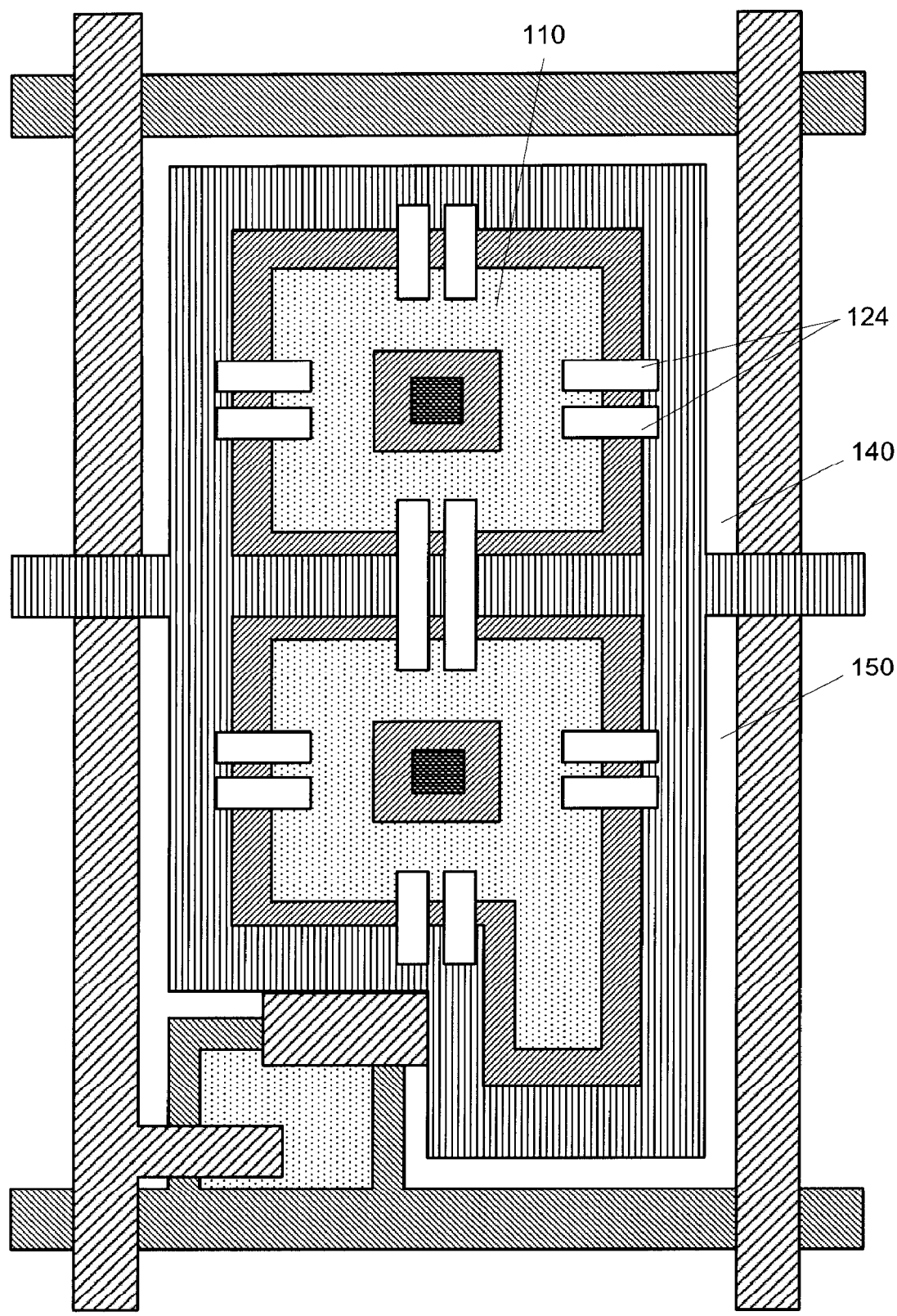

FIG. 3B shows a schematically plane view of one embodiment of a display pixel of an LCD device with a plurality of slits 124 arranged in a double-cross shape on the edge of the first pixel electrode 110 for each of the first portion 140 and the second portion 150 of the display pixel.

Figure 3C:
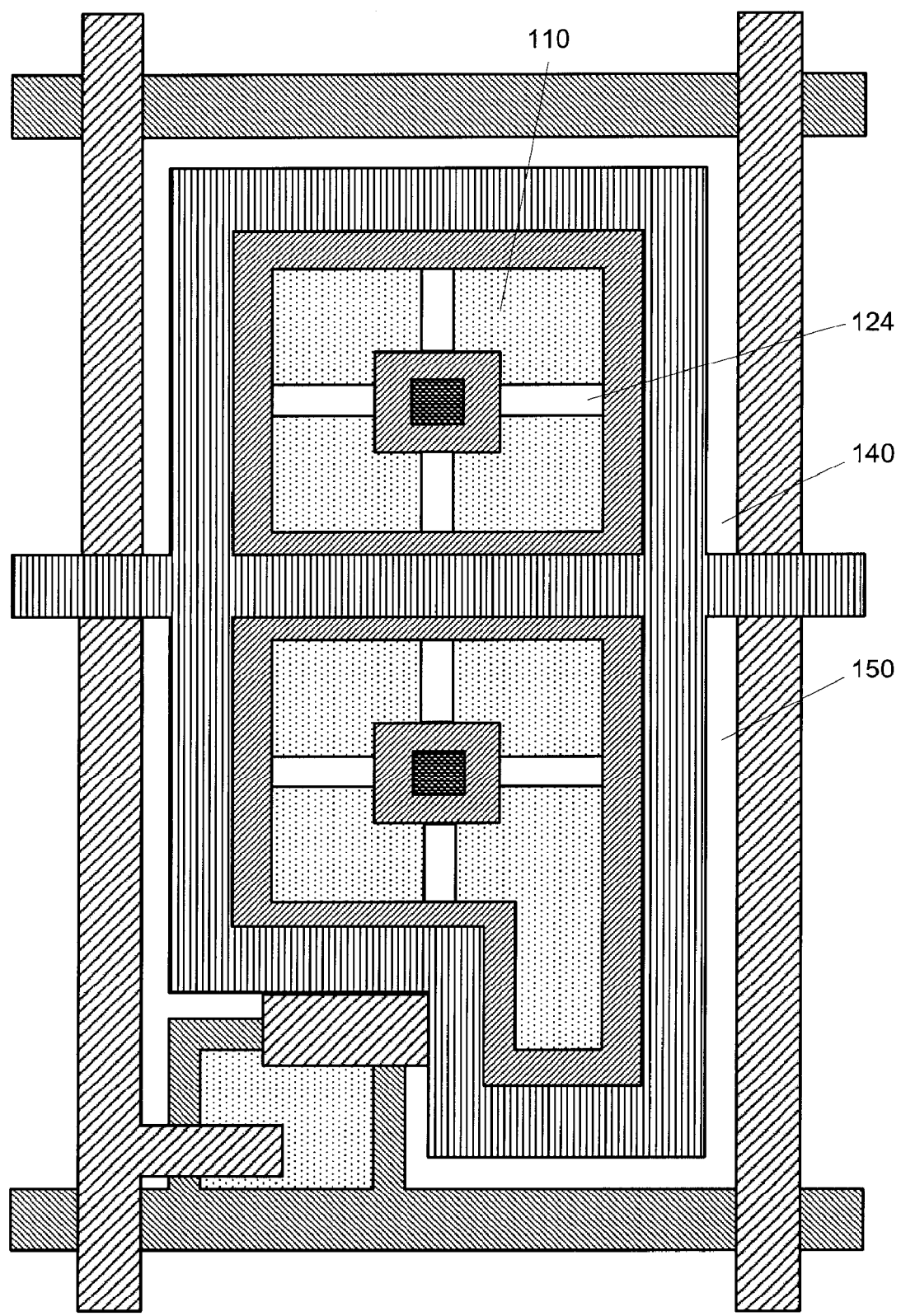

FIG. 3C shows a schematically plane view of one embodiment of a display pixel of an LCD device with a plurality of slits 124 arranged in a cross shape on the first pixel electrode 110 for each of the first portion 140 and the second portion 150 of the display pixel.

Figure 3D:
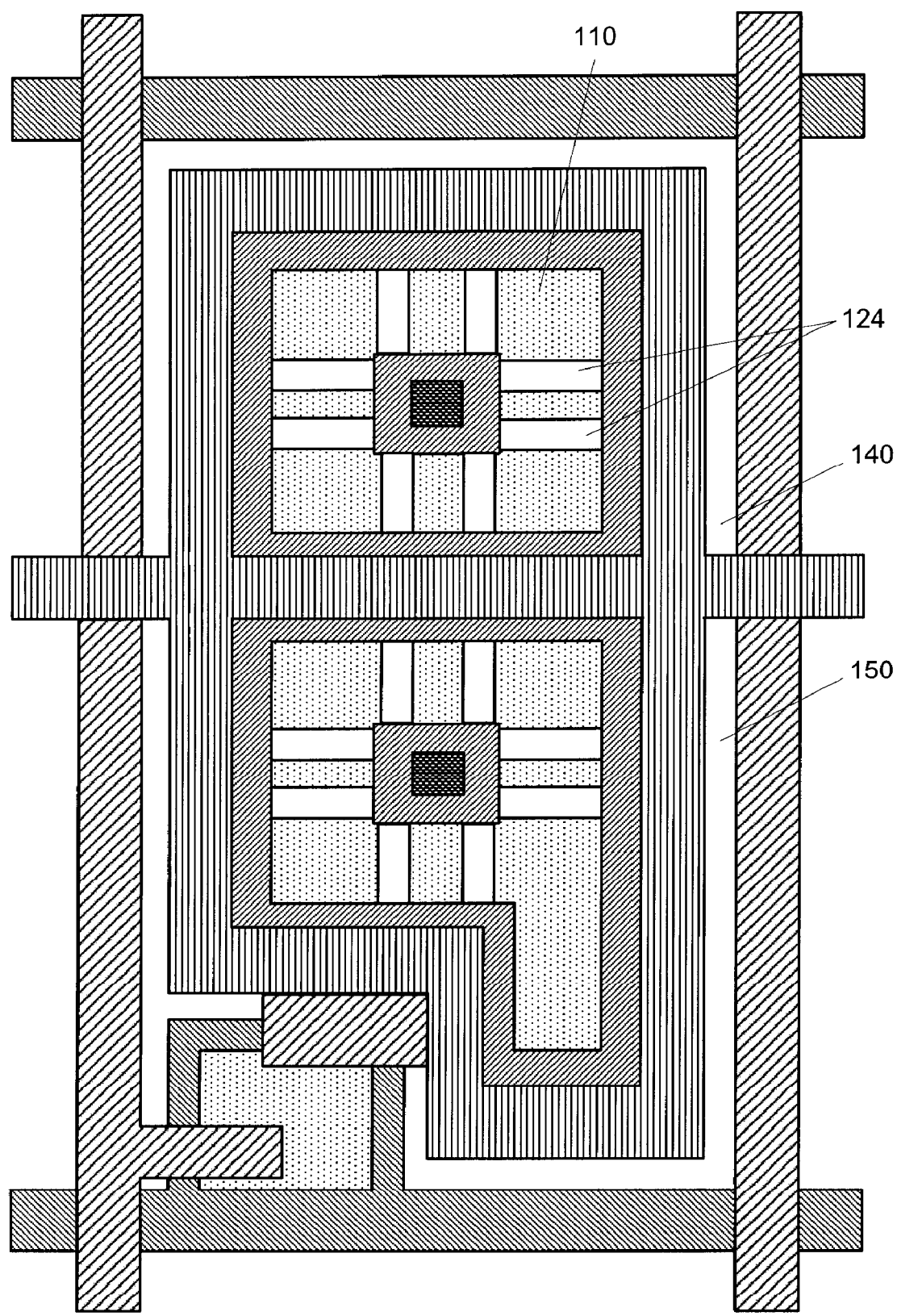

FIG. 3D shows a schematically plane view of one embodiment of a display pixel of an LCD device with a plurality of slits 124 arranged in a double-cross shape on the first pixel electrode 110 for each of the first portion 140 and the second portion 150 of the display pixel.

Figure 3E:
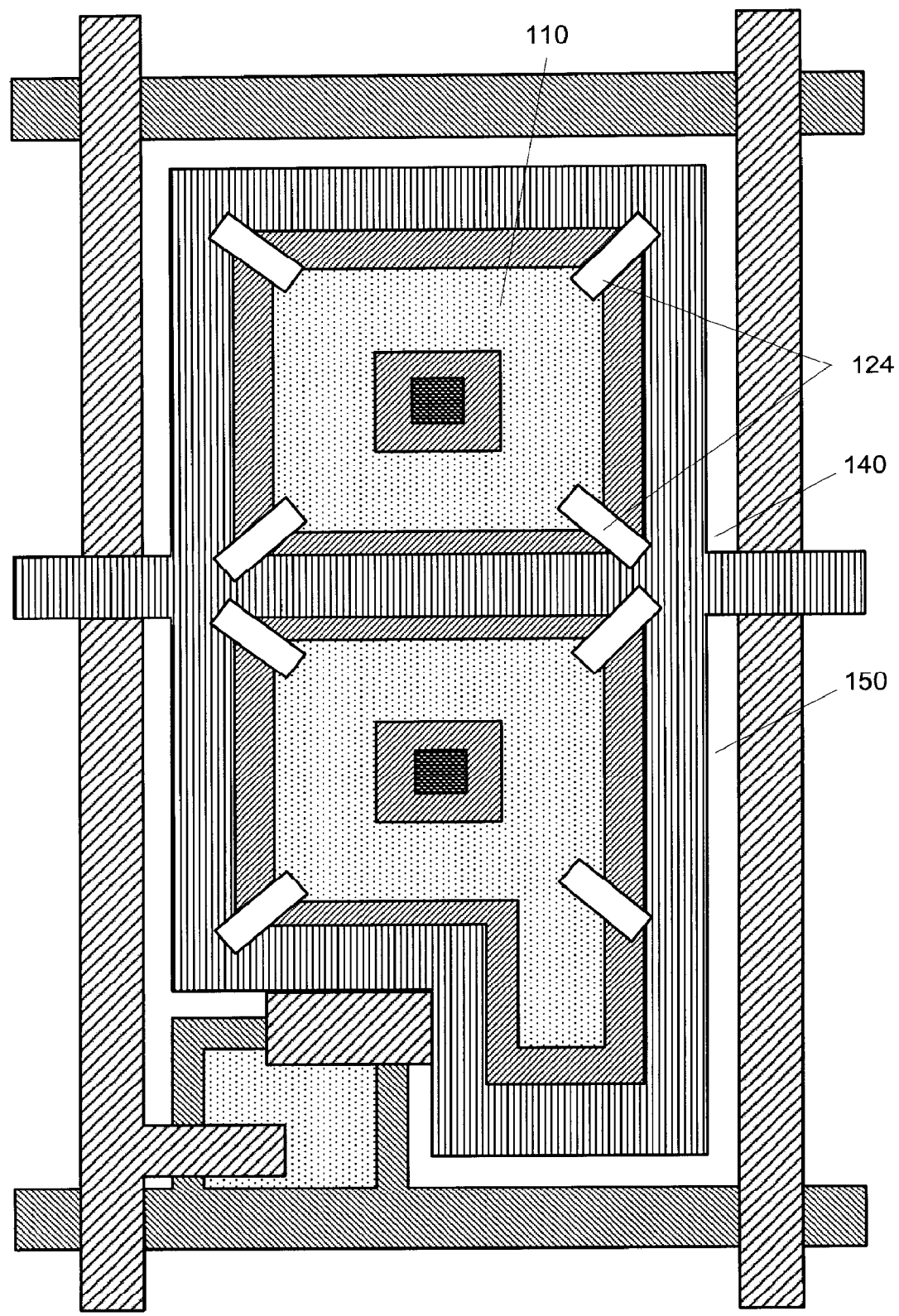

FIG. 3E shows a schematically plane view of one embodiment of a display pixel of an LCD device with a plurality of slits 124 arranged in a diagonal-cross shape on the edge of the first pixel electrode 110 for each of the first portion 140 and the second portion 150 of the display pixel.

Figure 3F:
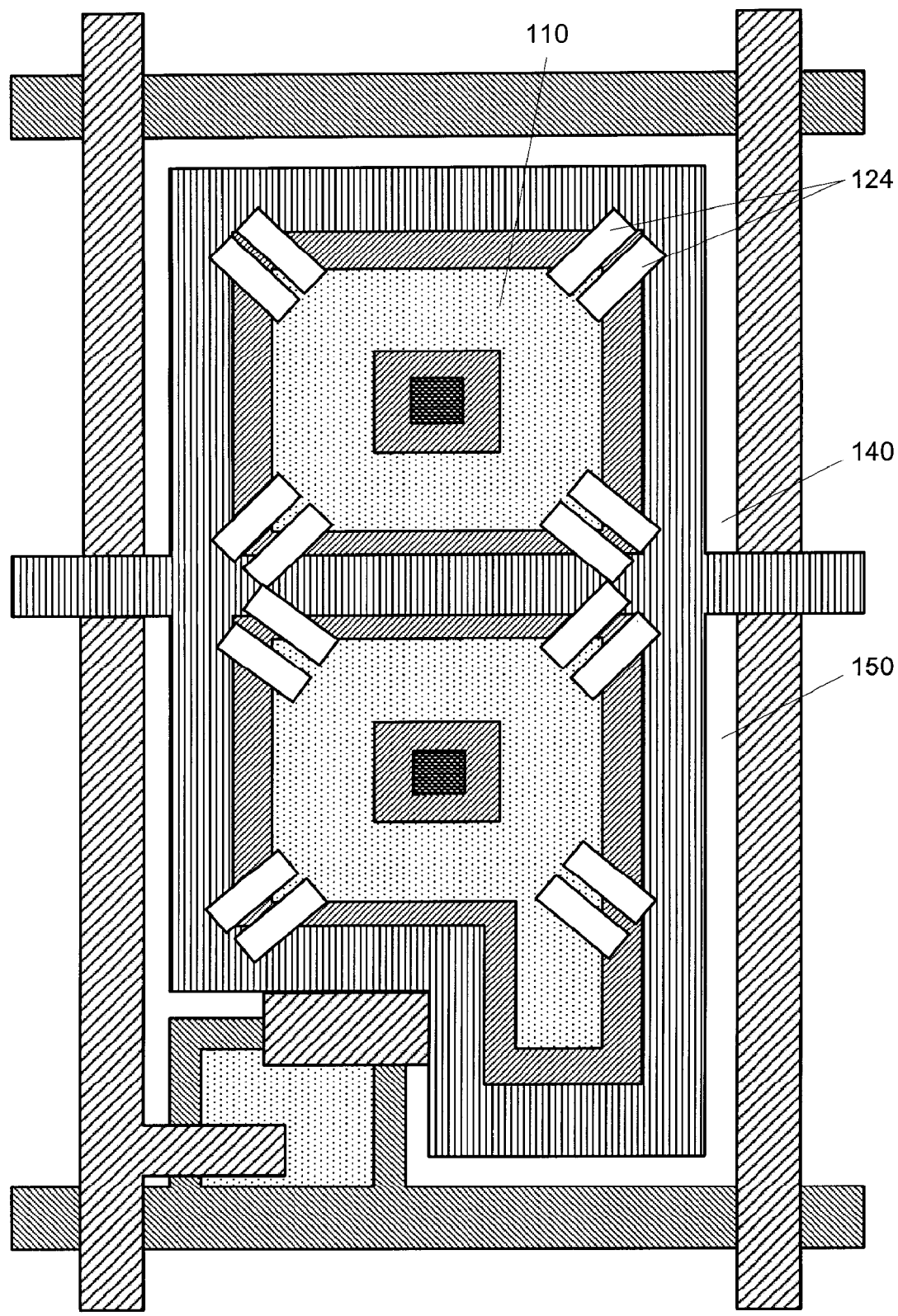

FIG. 3F shows a schematically plane view of one embodiment of a display pixel of an LCD device with a plurality of slits 124 arranged in a diagonal-double-cross shape on the edge of the first pixel electrode 110 for each of the first portion 140 and the second portion 150 of the display pixel.

Figure 3G:
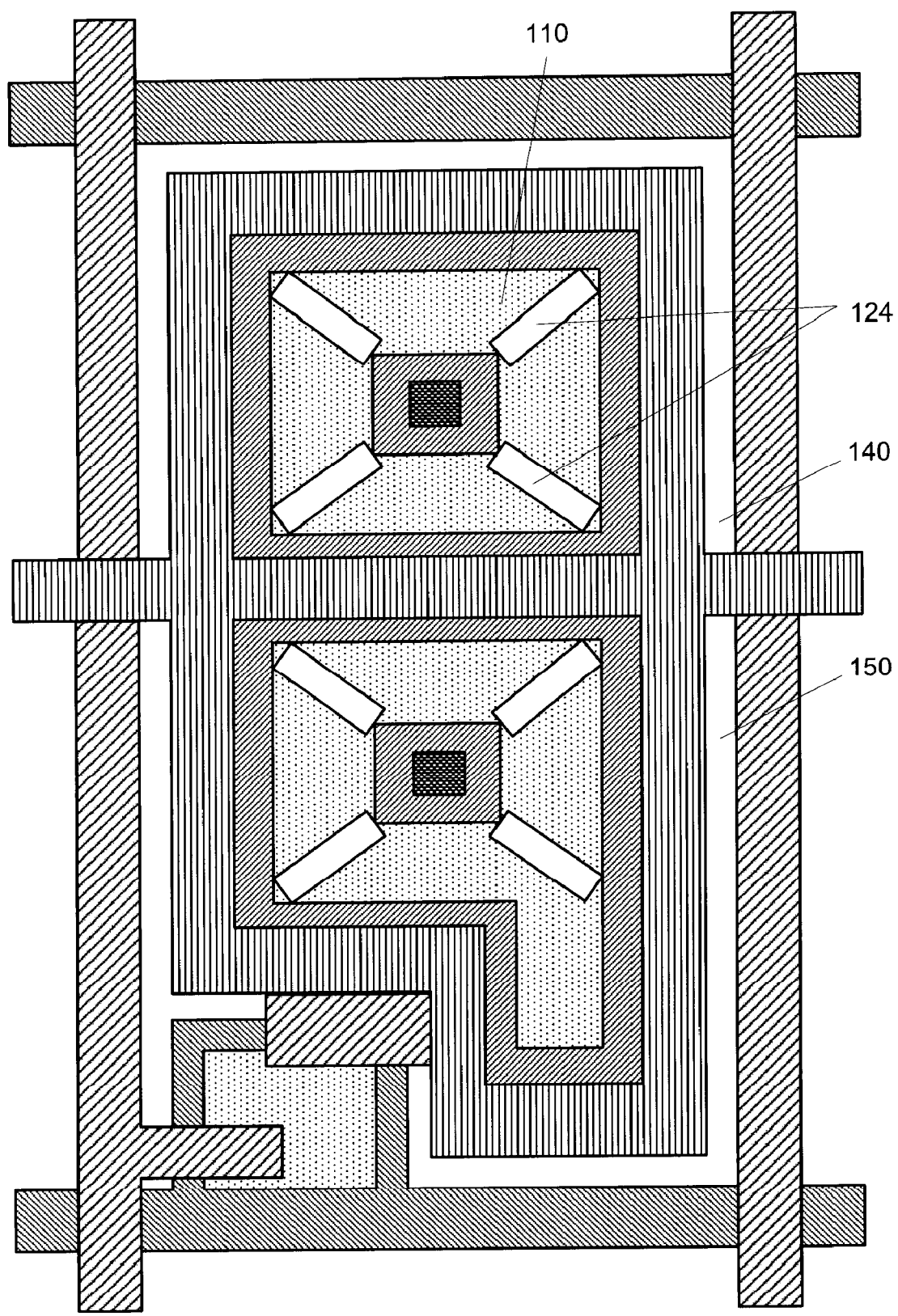

FIG. 3G shows a schematically plane view of one embodiment of a display pixel of an LCD device with a plurality of slits 124 arranged in a diagonal-cross shape on the first pixel electrode 110 for each of the first portion 140 and the second portion 150 of the display pixel.

Figure 3H:
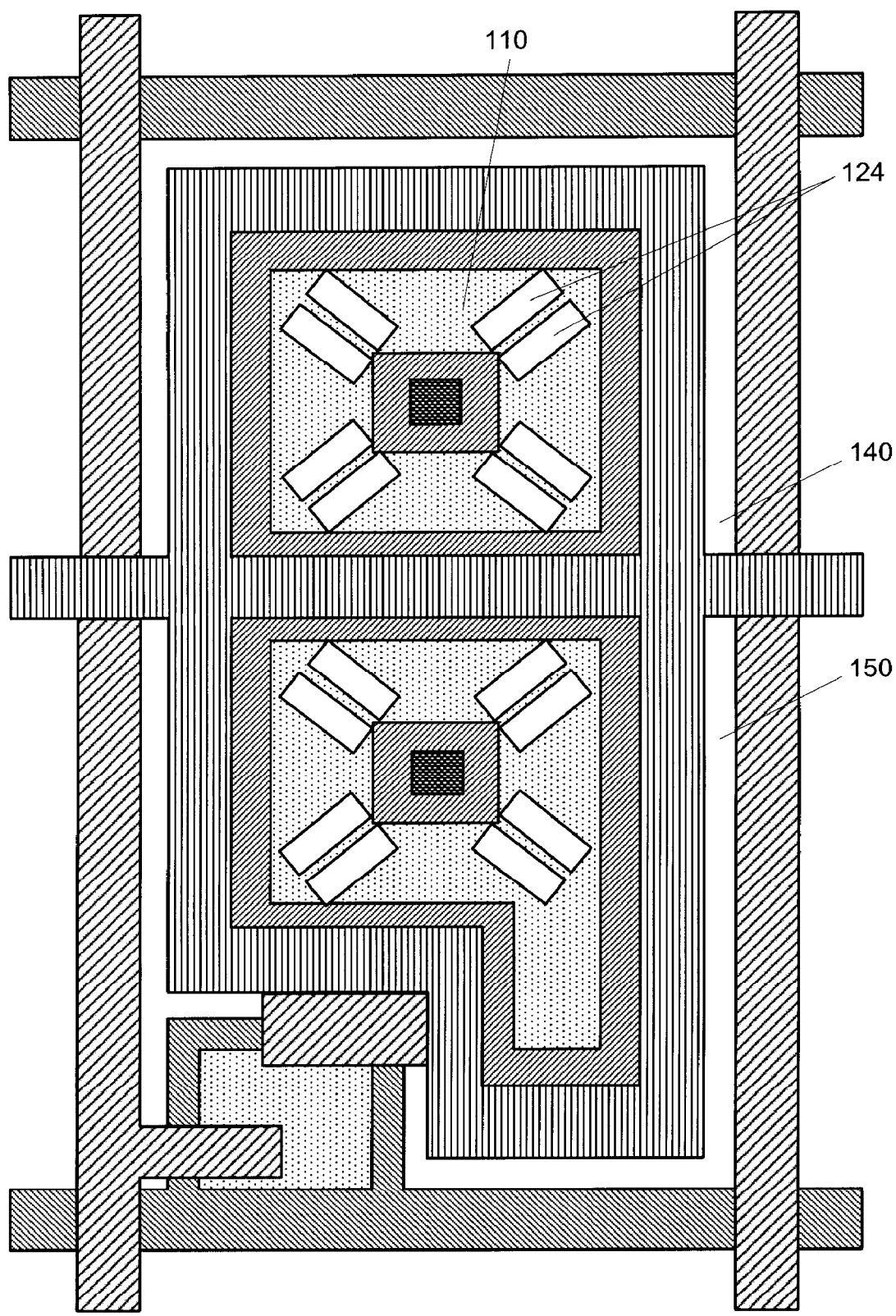

FIG. 3H shows a schematically plane view of one embodiment of a display pixel of an LCD device with a plurality of slits 124 arranged in a diagonal-double-cross shape on the first pixel electrode 110 for each of the first portion 140 and the second portion 150 of the display pixel.

Figure 3I:
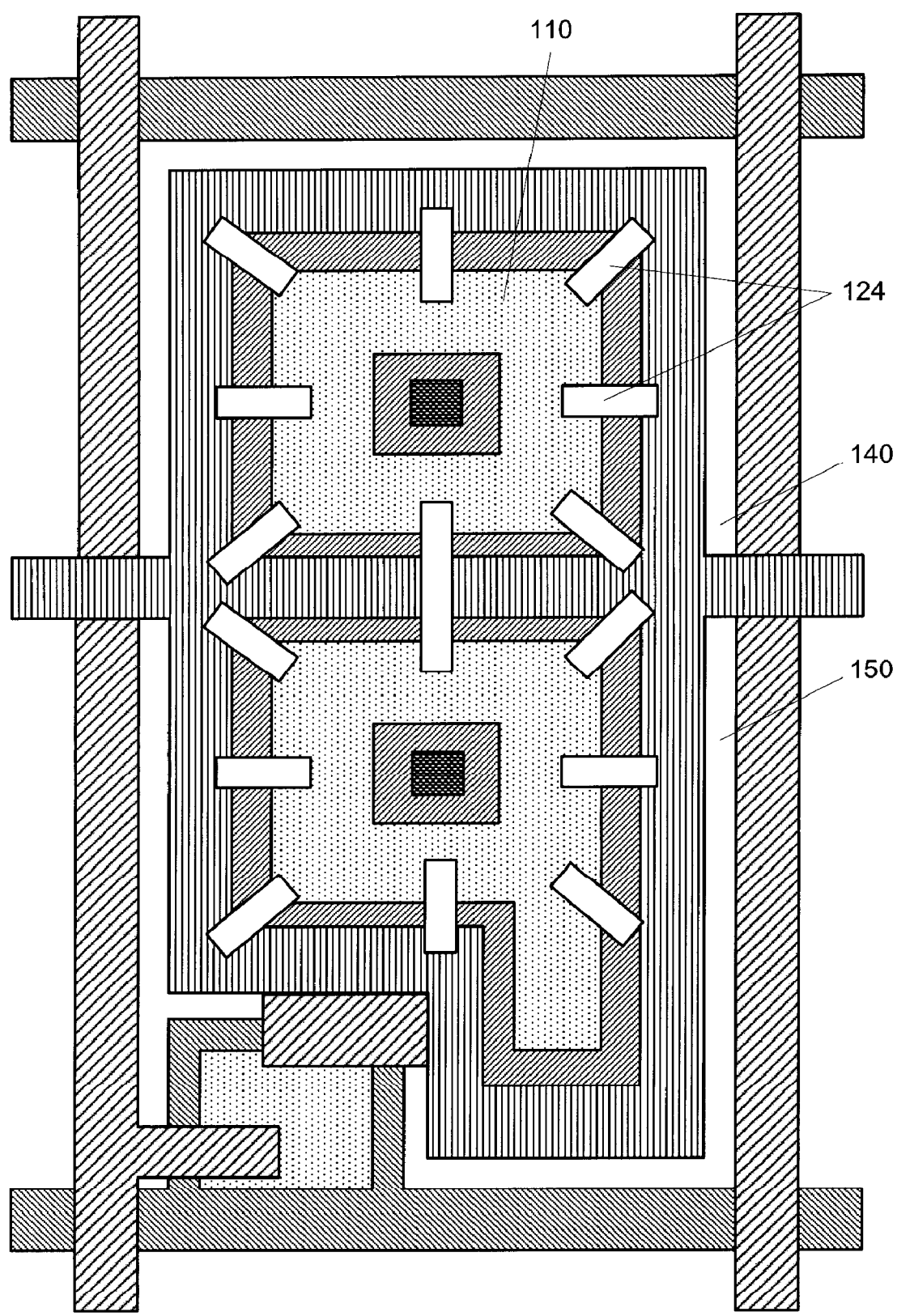

FIG. 3I shows a schematically plane view of one embodiment of a display pixel of an LCD device with a plurality of slits 124 arranged in a combined cross and diagonal cross shape on the edge of the first pixel electrode 110 for each of the first portion 140 and the second portion 150 of the display pixel.

Figure 3J:
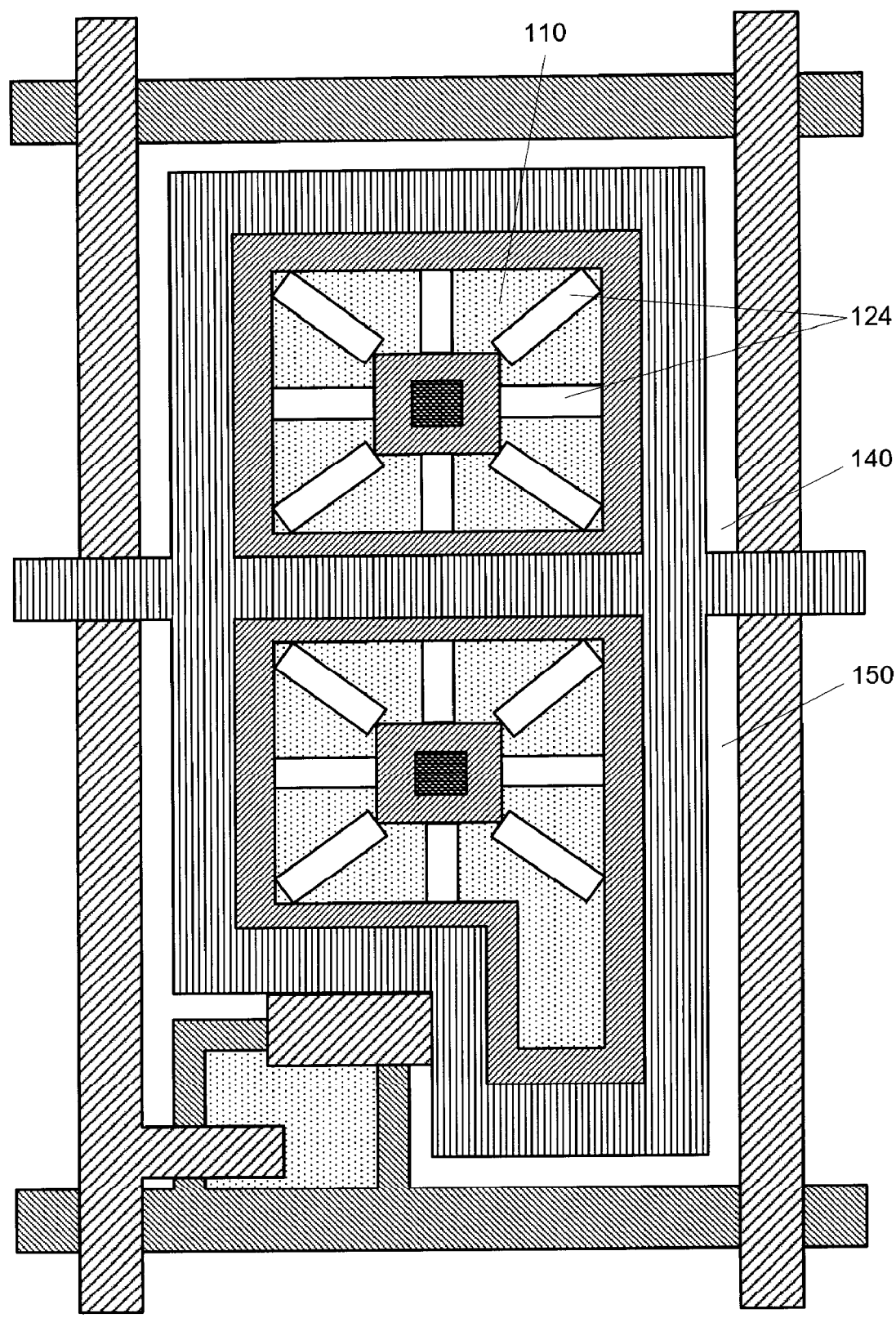

FIG. 3J shows a schematically plane view of one embodiment of a display pixel of an LCD device with a plurality of slits 124 arranged in a cross and diagonal cross combined shape on the first pixel electrode 110 for each of the first portion 140 and the second portion 150 of the display pixel.

Figure 4A:
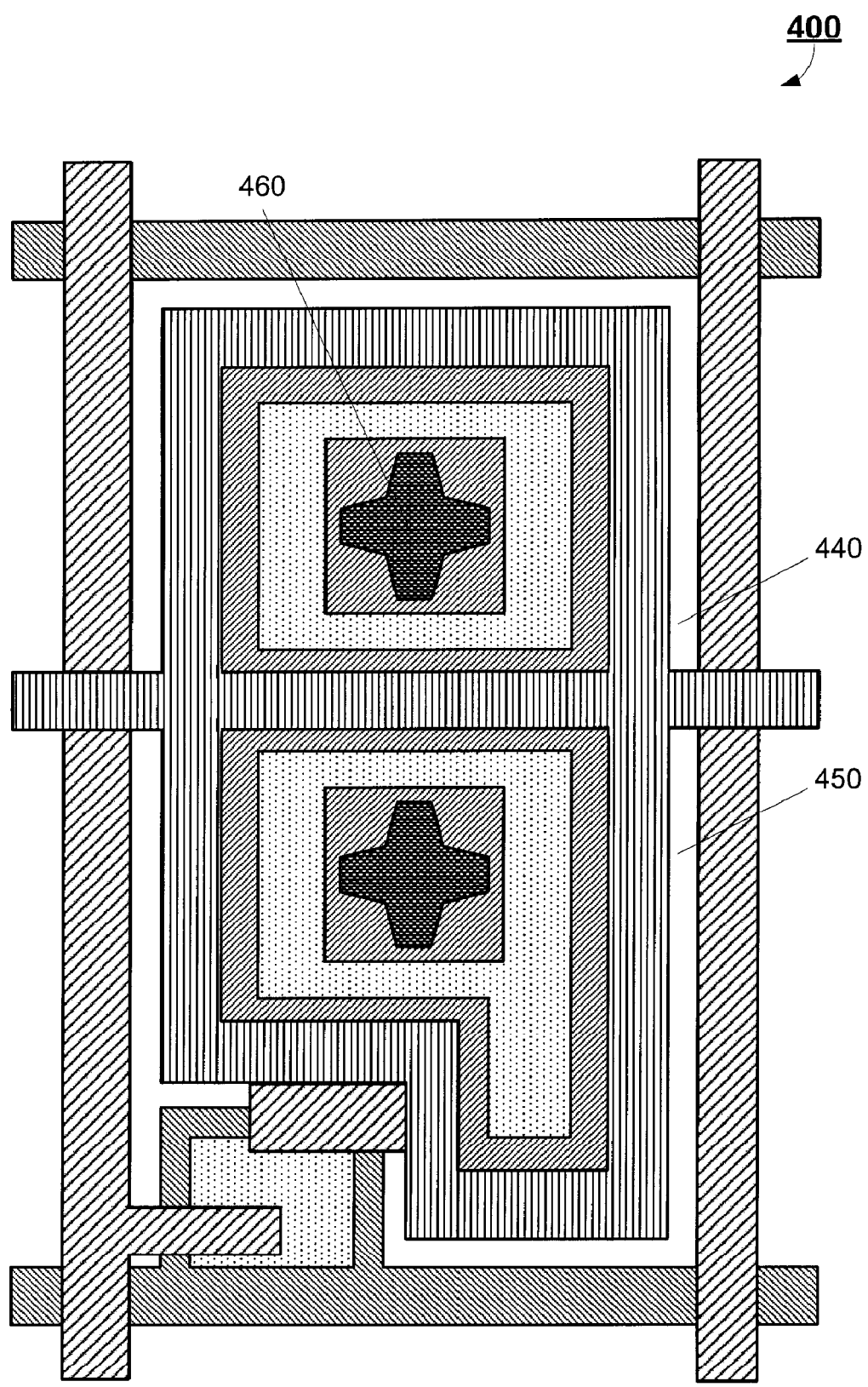
FIGS. 4A-4C show schematically plane views of various embodiments of display pixels of LCD devices with a plurality of second pixel electrode patterns according to embodiments of the present invention.
Figure 4B:
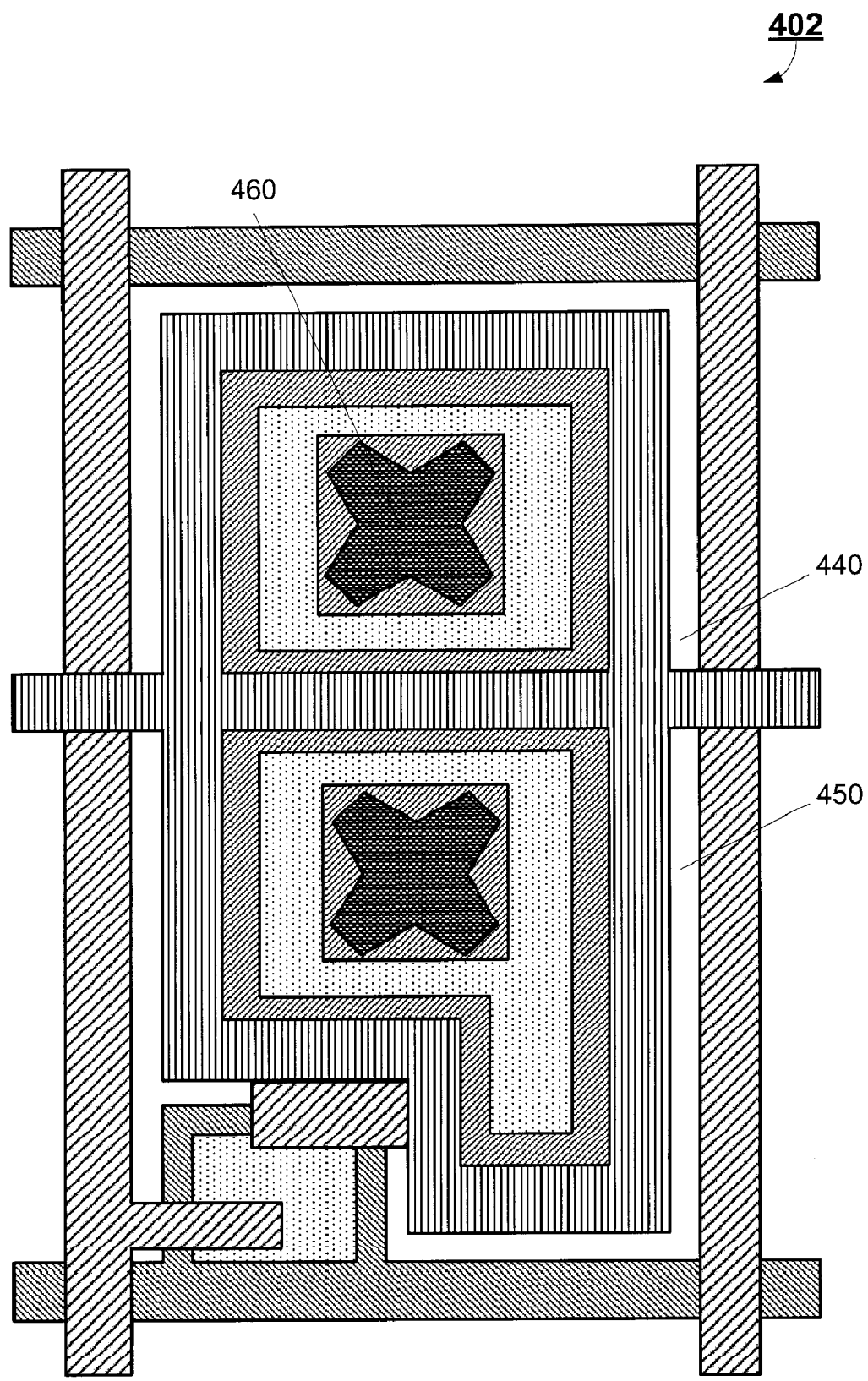
Figure 4C:
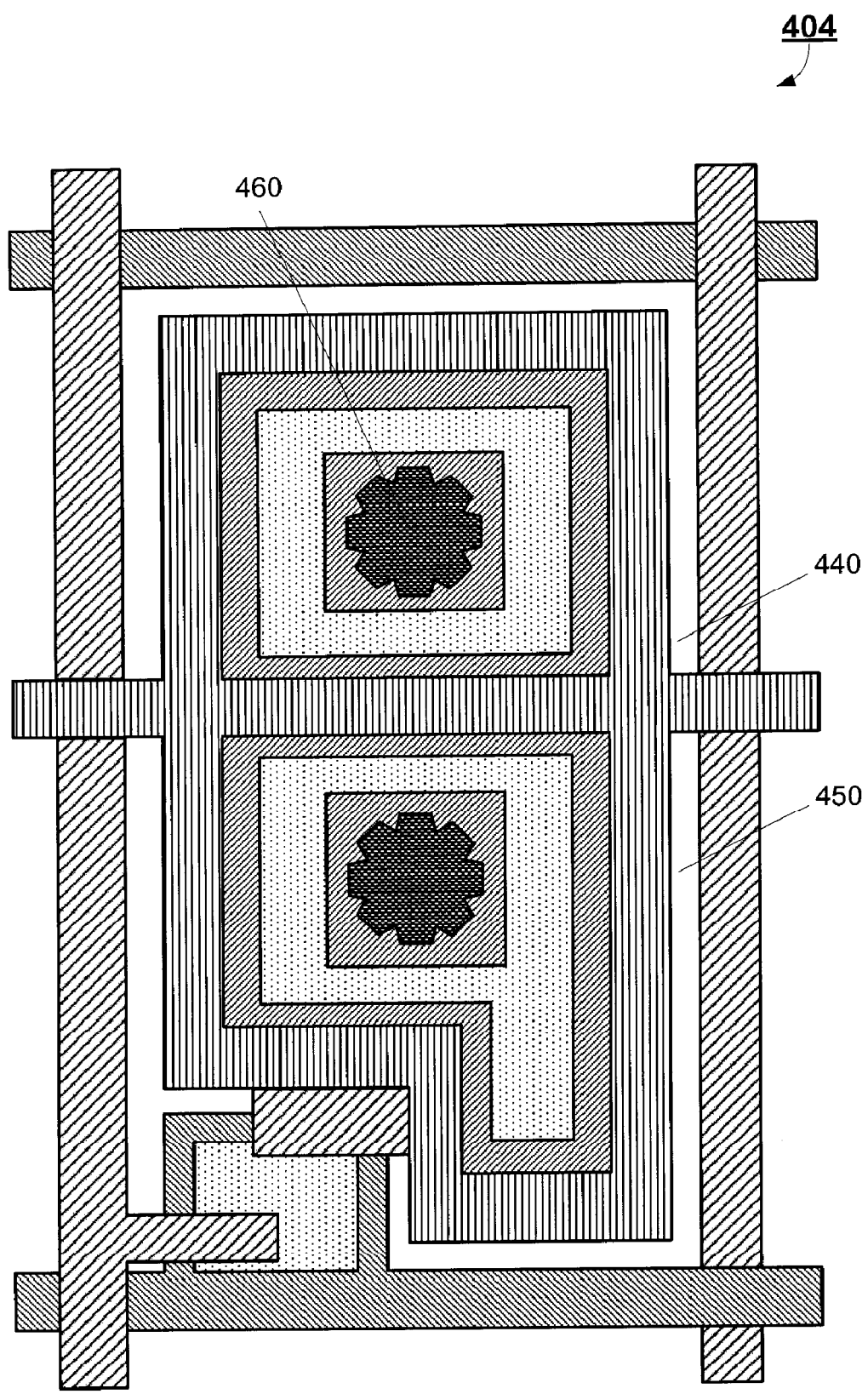

Other embodiments of LCD device with first pixel electrode slits include some embodiments with second pixel electrodes in different shapes. Referring now to FIGS. 4A to 4C, LCD devices 400, 402, and 404 have an almost identical structure as the embodiments of LCD devices disclosed in FIGS. 1, 2A and 2B. The only difference is that the second pixel electrodes 460 in FIGS. 4A to 4C are in different shapes. The shape of the second pixel electrodes 460 generated oblique electric field near the branch of the second pixel electrodes 460 drives the liquid crystals of the liquid crystal layer in desired directions and enhances the display viewing angles.

FIG. 4A shows a schematically plane view of one embodiment of a display pixel 400 of an LCD device with a cross shaped second pixel electrode 460 for each of the first portion 440 and the second portion 450 of the display pixel 400.

FIG. 4B shows a schematically plane view of one embodiment of a display pixel 402 of an LCD device with a diagonal cross shaped second pixel electrode 460 for each of the first portion 440 and the second portion 450 of the display pixel 402.

FIG. 4C shows a schematically plane view of one embodiment of a display pixel 404 of an LCD device with a combined cross and diagonal cross shaped second pixel electrode 460 for each of the first portion 440 and the second portion 450 of the display pixel 404.

LCD Device with Second Dielectric Layer Slits

Figure 5A:
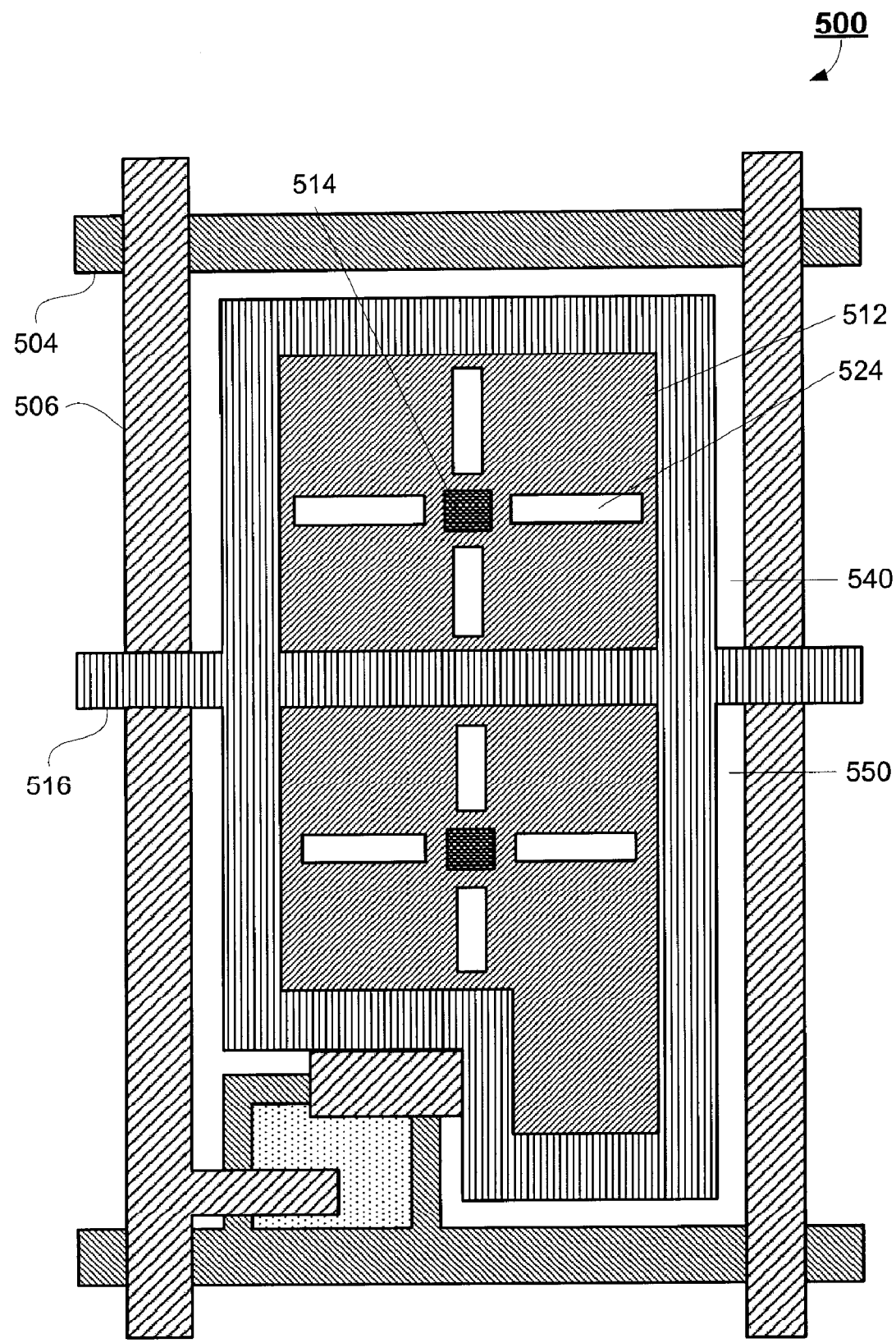
FIGS. 5A-5C show schematically plane views of various embodiments of display pixels of LCD devices with a plurality of slits on the second dielectric layer according to embodiments of the present invention.
Figure 5B:
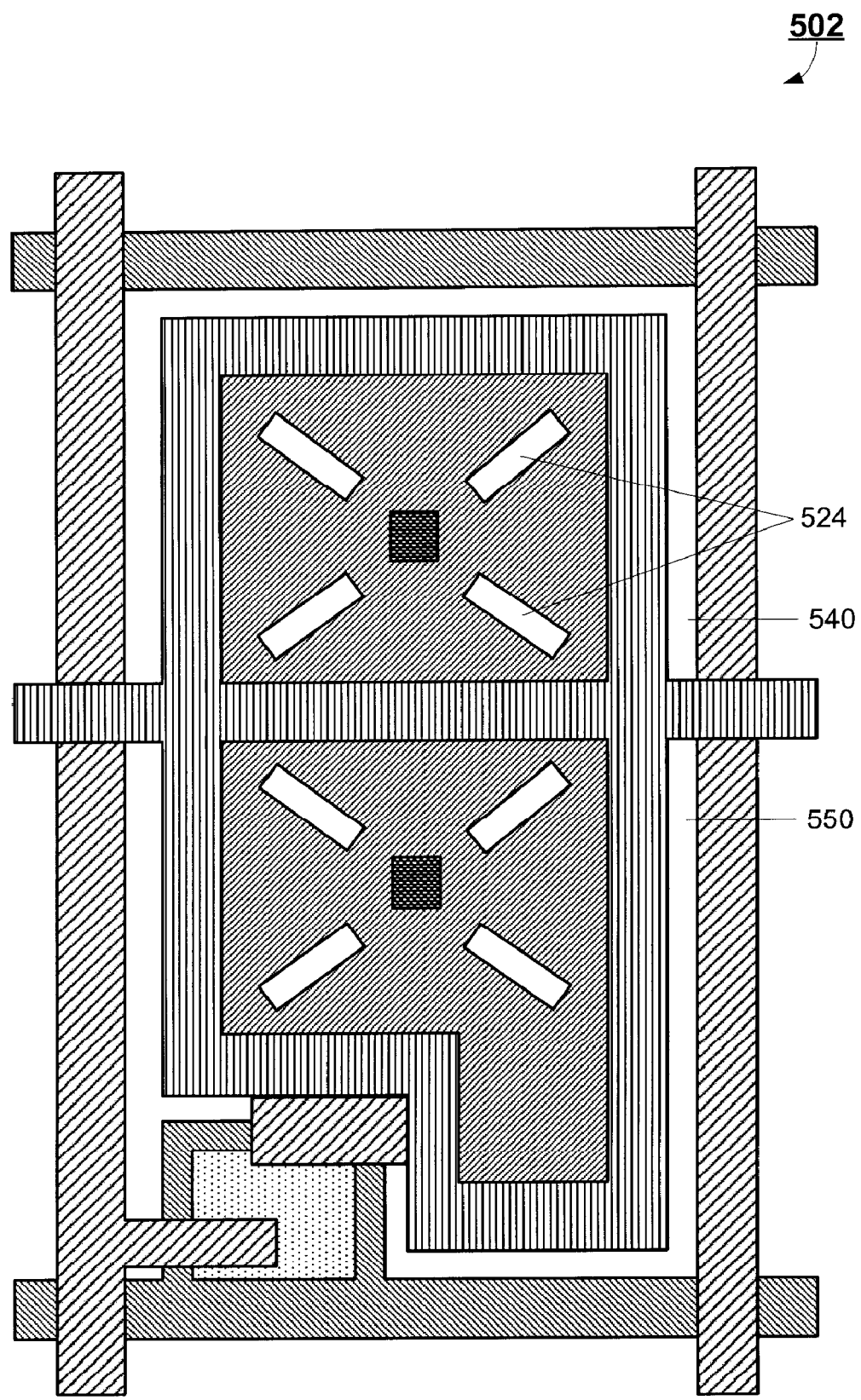
Figure 5C:
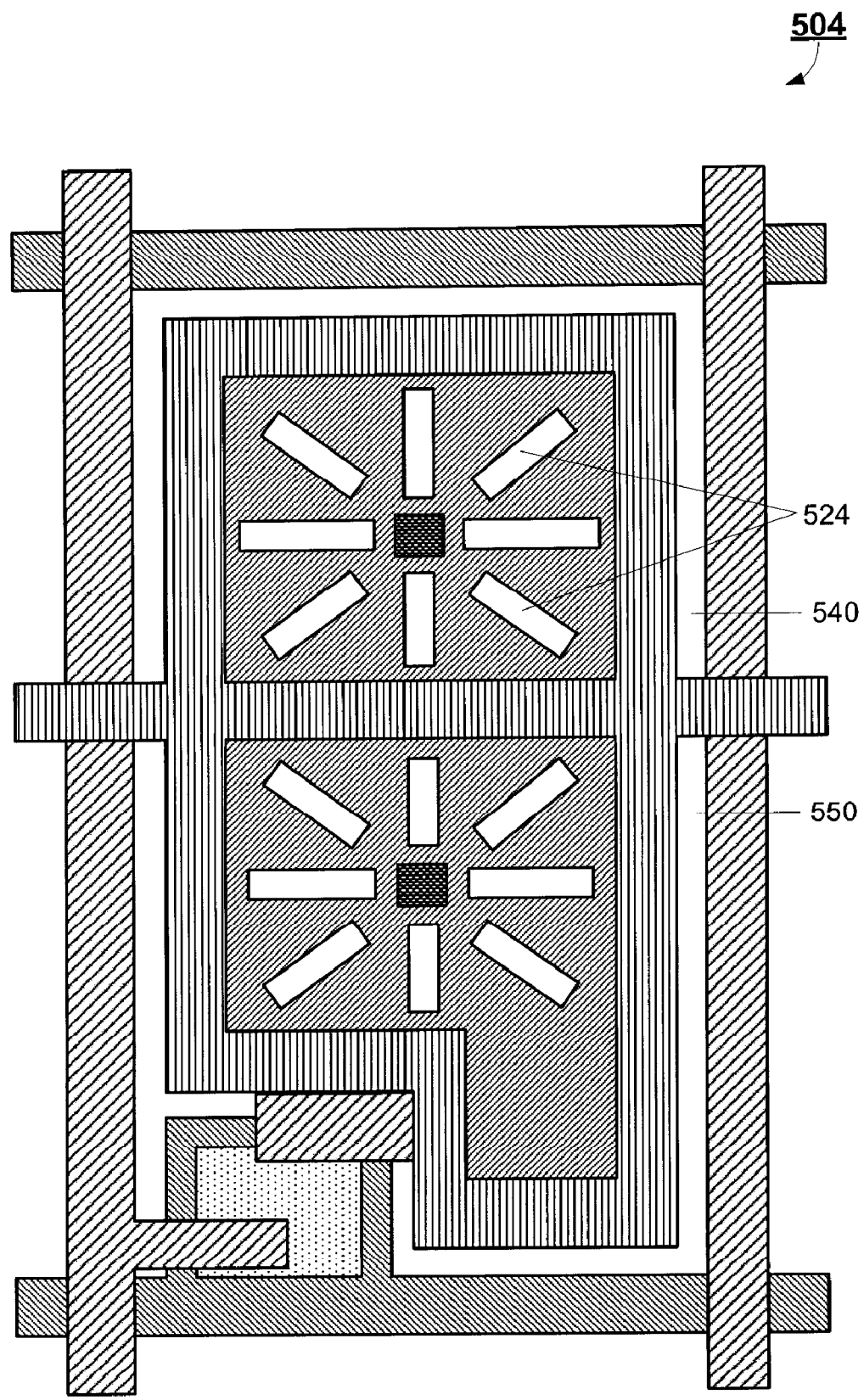
Figure 6:
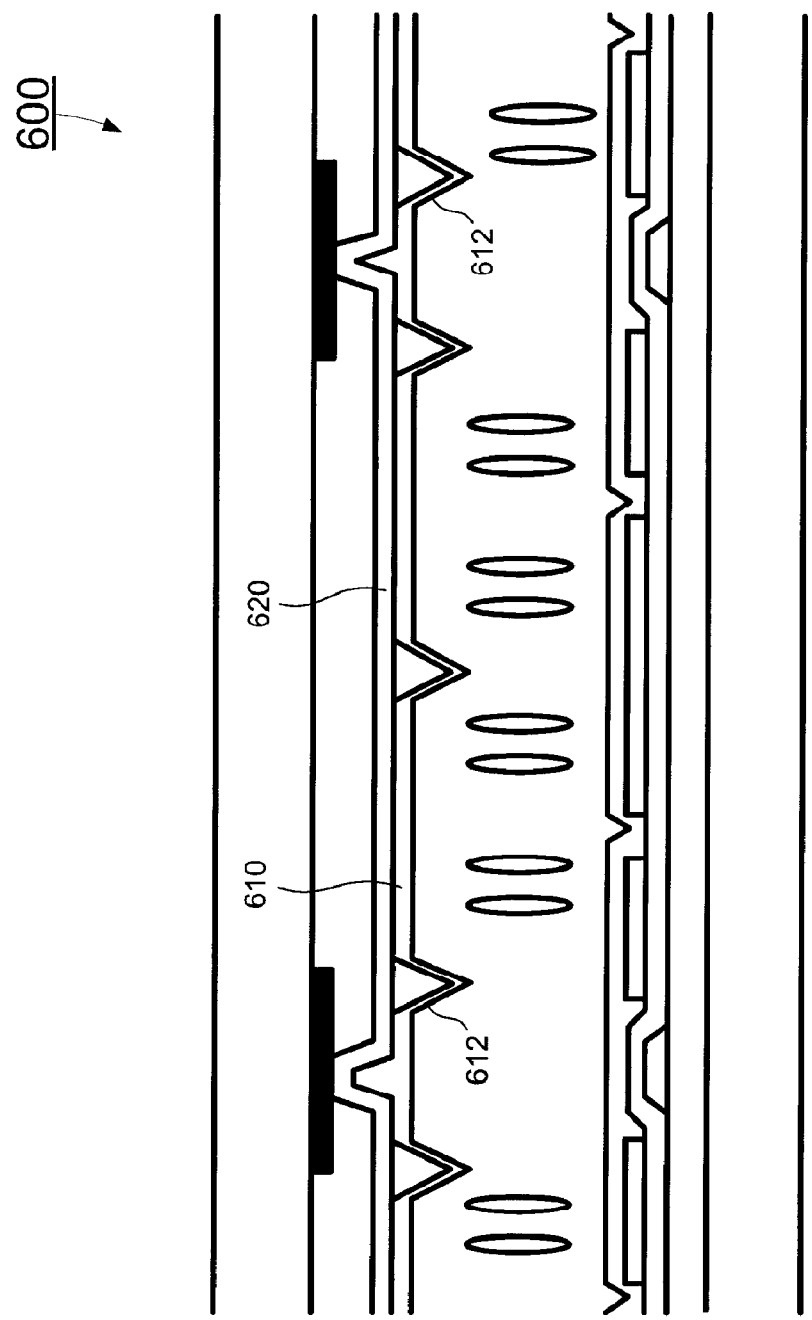
FIG. 6 shows schematically a cross-sectional view of a conventional LCD device.

Referring now to FIGS. 5A through 5C, LCD devices 500, 502, and 504 with a plurality of slits 524 on second dielectric layer are schematically shown according to various embodiments of the present invention, respectively. In one embodiment, the LCD device 500 is formed with a plurality of display pixels. Each display pixel has a first portion 540 and a second portion 550. Each of the first portion 540 and the second portion 550 has a first substrate 502 (not shown), a first dielectric layer (e.g., a gate insulating film) 508 (not shown), a second dielectric layer (e.g., a passivation layer) 512, a first pixel electrode 510 (not shown), a plurality of second pixel electrodes 514, a second dielectric layer 512, a common electrode 516, a gate line 504, a data line 506, a plurality of liquid crystals 518 (not shown), and a second substrate 520 (not shown). The disclosure here should be understood in connection with the description of FIGS. 1, 2A and 2B. All elements of the embodiment not shown here are similar to those elements with the same last two digits of the numerals detailed in the disclosure set forth above, which is incorporated herein by reference, and will not be repeated here.

The first dielectric layer 508 is formed of a dielectric material on the first substrate 502. A plurality of gate lines 504 and a plurality of data lines 506 are formed on the first dielectric layer 508. The plurality of gate lines 504 is arranged in a first direction and the plurality of data lines 506 is arranged crossing the plurality of gate lines 504 in a second direction on the first substrate 502 to define a plurality of pixels. In one embodiment, the plurality of pixels is arranged in a matrix. The first direction corresponds to the row direction of the pixel matrix, and the second direction corresponds to the column direction of the pixel matrix.

Each of the first portion 540 and the second portion 550 of the pixel includes a first pixel electrode 510, a second pixel electrode 514 and a common electrode 516. The first pixel electrode 510 is formed on the first dielectric layer 508 and spatially separated from its neighboring data lines 506 and gate lines 504. The second dielectric layer 512 is formed to cover the plurality of the first pixel electrodes 510, the plurality of gate lines 504, the plurality of data lines 506 and the remaining portion of the first dielectric layer 508. The second dielectric layer 512 has a plurality of slits 524 in each of the first portion 540 and the second portion 550 of the pixel. In each pixel, the second pixel electrode 514 is formed on the second dielectric layer 512 proximate to and around where the opening is located. Additionally, a common electrode 516 is formed on the second dielectric layer 512 and distantly and at least partially surrounds the second pixel electrode 514 in each pixel area.

In one embodiment, the first pixel electrode 510 is formed of indium zinc oxide (IZO), amorphous indium tin oxide (ITO), poly indium tin oxide (ITO), or any combination of these materials, and has a thickness in the range of about 0.01-3.00 μm.

In one embodiment, the second pixel electrode 514 and the common electrode 516 are formed of transparent or opaque conductivity material. The first dielectric layer 508 is formed of an insulating material such as SiNx, SiOx or SiON, or the like. The second dielectric layer 512 is formed of SiNx, SiOx, SiON or organic insulating material such as polyimide, and has a thickness in the range of about 0.01-100.00 μm.

The second pixel electrode 514 has a geometric shape of a square, circle, oval, rectangle, polygon, or a combination of these shapes, and a thickness in the range of about 0.01-6.00 μm. The size of the second pixel electrode 514 is smaller than the size of the second dielectric layer 512.

A liquid crystal layer is positioned between the first substrate 502 and the second substrate 520, and is filled with liquid crystals 518. In one embodiment, the liquid crystals include a liquid crystal material having a negative dielectric anisotropy, such as twisted nematic (TN) liquid crystals, for example. The liquid crystals are selected such that a product of the refractive index $\delta_n$ of the liquid crystals and the cell gap is in a range of about 0.01-1.00 μm. The liquid crystals 518 in the liquid crystal layer are aligned homeotropically to the first substrate 502 and the second substrate 520 in the absence of an electric field, which is corresponding to a black display in the LCD device.

In one embodiment, the common electrode 516 has a first electric potential, and the first pixel electrode 510 and the second pixel electrode 514 have an identical, second electric potential that is substantially different from the first electric potential. When a voltage is applied to one of the first pixel electrode 510 and the second pixel electrode 514, and the common electrode 516, a corresponding voltage difference is established between one of the first pixel electrode 510 and the second pixel electrode 514 and the common electrode 516, and an oblique electric field is generated in the liquid crystal layer.

In one embodiment, the second dielectric layer 512 has a plurality of slits 524. The plurality of slits 524 is arranged in a geometric shape of a cross, a double cross, a diagonal cross, a double diagonal cross, or a combination thereof. The generated oblique electric field near the plurality of slits 524 drives the liquid crystals of the liquid crystal layer in desired directions and enhances the display viewing angles.

FIG. 5A shows a schematically plane view of one embodiment of a display pixel 500 of an LCD device with a plurality of slits 524 arranged in a cross shape for each of the first portion 540 and the second portion 550 of the display pixel 500.

FIG. 5B shows a schematically plane view of one embodiment of a display pixel 502 of an LCD device with a plurality of slits 524 arranged in a diagonal cross shape for each of the first portion 540 and the second portion 550 of the display pixel 502.

FIG. 5C shows a schematically plane view of one embodiment of a display pixel 504 of an LCD device with a plurality of slits 524 arranged in a combined cross and diagonal cross shape for each of the first portion 540 and the second portion 550 of the display pixel 504.

The present invention, among other things, discloses an LCD device having a first pixel electrode and a second pixel electrode spatially separated by a passivation patterned structure, and a common electrode formed on the same layer as the second pixel electrode. The passivation patterned structure has an opening formed such that the second pixel electrode is electrically connected to the first pixel electrode through the opening. For such an LCD device, in operation, the common electrode and the common electrode have an identical, first electric potential, while the first pixel electrode and the second pixel electrode have an identical, second electrical potential that is substantially different from the first electric potential. Accordingly, the LCD device is operable with a wide viewing angle, higher transmittance, high contrast and fast response time of display.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD) device, comprising:
   a first substrate and a second substrate positioned apart to define a cell gap therebetween;
   a liquid crystal layer positioned in the cell gap between the first substrate and the second substrate; and
   a plurality of gate lines arranged in a first direction on the first substrate and a plurality of data lines arranged crossing the plurality of gate lines in a second direction that is substantially perpendicular to the first direction on the first substrate to define a plurality of pixels therewith, each pixel having a first portion and a second portion, and comprising:
   a first dielectric layer formed on the first substrate;
   a first pixel electrode formed on the first dielectric layer;
   a second dielectric layer formed to at least partially cover the first pixel electrode, wherein the second dielectric layer is formed with at least one opening in at least one of the first portion and the second portion of the pixel to expose at least one portion of the first pixel electrode;
   a second pixel electrode formed on the second dielectric layer and proximate to where the at least one opening is formed such that the second pixel electrode is connectable to the first pixel electrode through the at least one opening;
   a common electrode formed on the second dielectric layer; and
   a plurality of slits formed in the second dielectric layer.

2. The LCD device of claim 1, wherein the first pixel electrode is formed of indium zinc oxide (IZO), amorphous indium tin oxide (ITO), poly ITO, or a combination thereof.

3. The LCD device of claim 1, wherein the plurality of slits is formed to have a pattern of a cross, a double cross, a diagonal cross, a double diagonal cross, or a combination thereof.

4. The LCD device of claim 1, wherein the second pixel electrode has a geometric shape of a circle, oval, rectangle, polygon, or a combination thereof, and the size of the second pixel electrode is smaller than the size of the second dielectric layer.

5. The LCD device of claim 1, wherein the common electrode is on the same plane as the second pixel electrode and surrounding the second pixel electrode, and a distance is defined therebetween, which is greater than the cell gap.

6. The LCD device of claim 1, further comprising a plurality of slits formed in the first pixel electrode.

7. The LCD device of claim 6, wherein the plurality of slits is positioned within the first pixel electrode or along an edge of the first pixel electrode.

8. The LCD device of claim 7, wherein the plurality of slits is formed to have a pattern of a cross, a double cross, a diagonal cross, a double diagonal cross, or a combination thereof, and is symmetrically formed around the second pixel electrode located at a center of the first portion and the second portion of the pixel.

9. A liquid crystal display (LCD) device, comprising:
   a first substrate and a second substrate positioned apart to define a cell gap therebetween;
   a liquid crystal layer positioned in the cell gap between the first substrate and the second substrate; and
   a plurality of gate lines arranged in a first direction on the first substrate and a plurality of data lines arranged crossing the plurality of gate lines in a second direction that is substantially perpendicular to the first direction on the first substrate to define a plurality of pixels therewith, each pixel having a first portion and a second portion, and comprising:
   a first dielectric layer formed on the first substrate;
   a first pixel electrode formed on the first dielectric layer;
   a second dielectric layer formed to at least partially cover the first pixel electrode, wherein the second dielectric layer is formed with an inner portion, an outer portion and at least one opening in at least one of the first portion and the second portion of the pixel to expose at least one portion of the first pixel electrode, wherein each of the first portion and the second portion of the pixel has an inner portion and an outer portion;
   a second pixel electrode formed at a center of an inner portion of the second dielectric layer and proximate to the at least one opening in at least one of the first portion and the second portion of the pixel such that the second pixel electrode is connectable to the first pixel electrode through the at least one opening;
   a common electrode formed on the second dielectric layer; and
   a plurality of slits formed in the second dielectric layer.

10. The LCD device of claim 9, wherein the second pixel electrode has a geometric shape of a circle, oval, rectangle, polygon, cross, diagonal cross, or a combination thereof.

11. A liquid crystal display (LCD) device, comprising:
   a first substrate and a second substrate positioned apart to define a cell gap therebetween;
   a liquid crystal layer positioned in the cell gap between the first substrate and the second substrate; and
   a plurality of gate lines arranged in a first direction on the first substrate and a plurality of data lines arranged crossing the plurality of gate lines in a second direction that is substantially perpendicular to the first direction on the first substrate to define a plurality of pixels therewith, each pixel having a first portion and a second portion, and comprising:

a first dielectric layer formed on the first substrate;

a first pixel electrode formed on the first dielectric layer;

a second dielectric layer formed to at least partially cover the first pixel electrode, wherein the second dielectric layer is formed with at least one opening in at least one of the first portion and the second portion of the pixel to expose at least one portion of the first pixel electrode;

a second pixel electrode formed at a center of the second dielectric layer and proximate to the at least one opening in at least one of the first portion and the second portion of the pixel such that the second pixel electrode is connectable to the first pixel electrode through the at least one opening;

a plurality of slits symmetrically formed around the second pixel electrode; and a common electrode formed on the second dielectric layer.

12. The LCD device of claim 11, wherein the plurality of slits is formed to have a pattern of a cross, a double cross, a diagonal cross, a double diagonal cross, or a combination thereof.

13. A liquid crystal display (LCD) device, comprising:

a first substrate and a second substrate positioned apart to define a cell gap therebetween;

a liquid crystal layer positioned in the cell gap between the first substrate and the second substrate; and a plurality of gate lines arranged in a first direction on the first substrate and a plurality of data lines arranged crossing the plurality of gate lines in a second direction that is substantially perpendicular to the first direction on the first substrate to define a plurality of pixels therewith, each pixel having a first portion and a second portion, and comprising:

a first dielectric layer formed on the first substrate;

a first pixel electrode formed on the first dielectric layer;

a second dielectric layer formed to at least partially cover the first pixel electrode, wherein the second dielectric layer is formed with at least one opening in at least one of the first portion and the second portion of the pixel to expose at least one portion of the first pixel electrode;

a second pixel electrode formed on the second dielectric layer and proximate to where the at least one opening is formed such that the second pixel electrode is connectable to the first pixel electrode through the at least one opening; and a common electrode formed on the second dielectric layer, wherein the second pixel electrode has a geometric shape of a circle, oval, rectangle, polygon, or a combination thereof, and the size of the second pixel electrode is smaller than the size of the second dielectric layer.

14. A liquid crystal display (LCD) device, comprising:

a first substrate and a second substrate positioned apart to define a cell gap therebetween;

a liquid crystal layer positioned in the cell gap between the first substrate and the second substrate; and a plurality of gate lines arranged in a first direction on the first substrate and a plurality of data lines arranged crossing the plurality of gate lines in a second direction that is substantially perpendicular to the first direction on the first substrate to define a plurality of pixels therewith, each pixel having a first portion and a second portion, and comprising:

a first dielectric layer formed on the first substrate;

a first pixel electrode formed on the first dielectric layer;

a second dielectric layer formed to at least partially cover the first pixel electrode, wherein the second dielectric layer is formed with at least one opening in at least one of the first portion and the second portion of the pixel to expose at least one portion of the first pixel electrode;

a second pixel electrode formed on the second dielectric layer and proximate to where the at least one opening is formed such that the second pixel electrode is connectable to the first pixel electrode through the at least one opening; and a common electrode formed on the second dielectric layer, wherein the common electrode is on the same plane as the second pixel electrode and surrounding the second pixel electrode, and a distance is defined therebetween, which is greater than the cell gap.

15. A liquid crystal display (LCD) device, comprising:

a first substrate and a second substrate positioned apart to define a cell gap therebetween;

a liquid crystal layer positioned in the cell gap between the first substrate and the second substrate; and a plurality of gate lines arranged in a first direction on the first substrate and a plurality of data lines arranged crossing the plurality of gate lines in a second direction that is substantially perpendicular to the first direction on the first substrate to define a plurality of pixels therewith, each pixel having a first portion and a second portion, and comprising:

a first dielectric layer formed on the first substrate;

a first pixel electrode formed on the first dielectric layer;

a second dielectric layer formed to at least partially cover the first pixel electrode, wherein the second dielectric layer is formed with at least one opening in at least one of the first portion and the second portion of the pixel to expose at least one portion of the first pixel electrode;

a second pixel electrode formed on the second dielectric layer and proximate to where the at least one opening is formed such that the second pixel electrode is connectable to the first pixel electrode through the at least one opening;

a common electrode formed on the second dielectric layer; and a plurality of slits formed in the first pixel electrode, wherein the plurality of slits is positioned within the first pixel electrode or along an edge of the first pixel electrode; and wherein the plurality of slits is formed to have a pattern of a cross, a double cross, a diagonal cross, a double diagonal cross, or a combination thereof, and is symmetrically formed around the second pixel electrode located at a center of the first portion and the second portion of the pixel.

* * * * *